United States Patent
Kazeto et al.

(10) Patent No.: US 6,964,990 B2
(45) Date of Patent: Nov. 15, 2005

(54) ETHYLENE-VINYL ALCOHOL COPOLYMER RESIN COMPOSITION OF IMPROVED LONG-RUN WORKABILITY, AND ITS SHAPED ARTICLES

(75) Inventors: Osamu Kazeto, Kurashiki (JP); Naokiyo Inomata, Kurashiki (JP); Naoyuki Himi, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/734,200

(22) Filed: Dec. 12, 2000

(65) Prior Publication Data

US 2001/0025087 A1 Sep. 27, 2001

(30) Foreign Application Priority Data

Dec. 16, 1999 (JP) .............................. 11-356741
Dec. 16, 1999 (JP) .............................. 11-356742

(51) Int. Cl.$^7$ ................................................ C08K 5/09
(52) U.S. Cl. ................. 524/284; 524/320; 524/394; 524/400; 524/405; 524/503; 524/557
(58) Field of Search ................. 524/320, 394, 524/400, 284, 405, 503, 557

(56) References Cited

U.S. PATENT DOCUMENTS

| | | | | |
|---|---|---|---|---|
| 5,032,632 A | * | 7/1991 | Saxton | ........................ 524/139 |
| 5,118,743 A | * | 6/1992 | Yonezu et al. | ............... 524/284 |
| 5,360,670 A | * | 11/1994 | Yonezu et al. | ............... 428/412 |
| 6,174,949 B1 | * | 1/2001 | Ninomiya et al. | ........... 524/404 |
| 6,184,288 B1 | * | 2/2001 | Ninomiya et al. | ............. 525/61 |
| 6,232,382 B1 | * | 5/2001 | Ninomiya et al. | ........... 524/400 |
| 6,238,606 B1 | * | 5/2001 | Kunieda et al. | ............. 264/143 |
| 6,242,087 B1 | * | 6/2001 | Kawai | ......................... 428/336 |
| 6,451,898 B1 | | 9/2002 | Tanimoto et al. | |
| 6,485,842 B1 | * | 11/2002 | Shindome et al. | .......... 428/522 |
| 6,780,931 B2 | | 8/2004 | Tanimoto et al. | |
| 6,806,305 B2 | | 10/2004 | Kato et al. | |
| 2003/0060550 A1 | * | 3/2003 | Inomata et al. | ............. 524/394 |

FOREIGN PATENT DOCUMENTS

| | | |
|---|---|---|
| EP | 0 308 703 | 3/1989 |
| EP | 0 386 720 | 9/1990 |
| EP | 0 458 509 | 11/1991 |
| EP | 0 892 006 | 1/1999 |
| EP | 0 906 924 | 4/1999 |
| EP | 0 930 339 | 7/1999 |
| EP | 1 036 652 | 10/1999 |
| EP | 1 067 152 | 7/2000 |
| EP | 1 090 953 | 9/2000 |
| JP | 56-41204 | 4/1981 |
| JP | 10-067898 | 3/1998 |

* cited by examiner

*Primary Examiner*—Bernard Lipman
(74) *Attorney, Agent, or Firm*—Oblon, Spivak, McClelland, Maier & Neustadt, P.C.

(57) ABSTRACT

A resin composition of an ethylene-vinyl alcohol copolymer adheres little to dies and ensures good long-run workability and self-purgeability and its shaped articles have good appearance with few voids and show diminished yellowing.

9 Claims, 2 Drawing Sheets

ETHYLENE-VINYL ALCOHOL COPOLYMER RESIN COMPOSITION OF IMPROVED LONG-RUN WORKABILITY, AND ITS SHAPED ARTICLES

BACKGROUND OF THE INVENTION

1. Field of the Invention

The present invention relates to a resin composition comprising an ethylene-vinyl alcohol copolymer (EVOH) and a multi-layered structure comprising the resin composition. When fabricated into shaped articles, the resin composition adheres little to dies and ensures good long-run workability and good self-purgeability in working lines. The shaped articles fabricated have good appearance with few voids and are yellowed little.

2. Description of the Related Art

EVOH is a useful polymer material having good gas (e.g., oxygen) barrier properties, oil resistance, antistatic properties and mechanical strength, and is widely used for various wrapping and packaging materials such as films, sheets and containers. Such wrapping and packaging materials are generally produced by working polymers in melt. Therefore, the polymers for them are required to have good long-run workability while worked in melt (that is, they can be worked into good products with neither fish eyes nor streaks even in long-run working lines), and their shaped articles are required to have good appearance (that is, they have few gels).

However, since the hydroxyl groups existing in the molecule of EVOH are chemically active in some degree, EVOH is, when melted at high temperatures, often oxidized and crosslinked even in an extrusion machine that contains little oxygen therein. When worked continuously in a long-run working line, EVOH is often thermally degraded to form thermal deposits in the working machine, as its thermal stability is not so good. Such thermal deposits are problematic, as causing fish eyes in the shaped articles of EVOH.

To solve the problem, known are various methods of adding minor acids and/or metal salts to EVOH.

(1) An EVOH composition is disclosed, which contains from 0.0005 to 0.05% by weight (in terms of the metal element) of a salt of a metal of Group 2 of the Periodic Table, from 0.002 to 0.2% by weight of an acid having a pKa of at least 3.5 and a boiling point of not lower than 180° C., and from 0.01 to 0.2% by weight of an acid having a pKa of at least 3.5 and a boiling point of not higher than 120° C., and having a specific fluidity characteristic (JP-A-66262/1989, EP 308,703). They say that the EVOH composition with such additives has improved long-run workability and its shaped articles have good appearance with few fish eyes.

(2) Also disclosed is an EVOH resin composition, which contains from 100 to 5000 ppm, in terms of the free acid, of a hydroxycarboxylic acid and/or its salt, from 50 to 500 ppm, in terms of the metal element, of an alkali metal salt (C), and from 20 to 200 ppm, in terms of the metal element, of an alkaline earth metal salt (B) (JP-A-67898/1998). They say that the composition is, when worked into shaped articles, yellowed little and has good adhesiveness, and that its shaped articles have few fish eyes.

(3) Disclosed is an EVOH composition substantially containing from about 0.01 to about 0.5% by weight of a monovalent or divalent metal salt of at least aliphatic carboxylic acid having from 3 to 9 carbon atoms, and from about 0.05 to about 0.5 parts by weight of at least one hindered phenolic antioxidant (JP-A-227744/1992). They say that the EVOH composition is stable even at high temperatures and is oxidized little to form gel.

(4) Disclosed is an EVOH resin composition containing from 0.001 to 1.0% by weight, in terms of the boron element, of a boron compound (A), from 0.001 to 0.1% by weight of sodium acetate (B), from 0.001 to 0.1% by weight of magnesium acetate, and at most 0.01% by weight of acetic acid (JP-A-60874/1999). They say that the composition ensures good long-run workability when worked in melt, and gives shaped articles having good appearance. Comparative Example 6 given in the publication is an EVOH resin composition containing 0.031% (in terms of the boron element) of boric acid, 0.0093% by weight (in terms of sodium) of sodium acetate, and 0.120% by weight (in terms of magnesium) of magnesium acetate, but they say that the comparative resin composition could not be formed into film since its melt viscosity is too low.

(5) Disclosed is an EVOH resin composition comprising 100 parts by weight of EVOH, at most 0.05 parts by weight of acetic acid, and from 0.001 to 0.02 parts by weight, in terms of the metal element, of magnesium acetate and/or calcium acetate (JP-A-106592/1999, EP 906,924). They say that the resin composition ensures, when worked in melt, long-run workability and is formed into shaped articles having good appearance, and that, when used in producing laminates, the resin composition is odorless and ensures good interlayer adhesiveness.

In the related art disclosures (1) to (5), the EVOH compositions could ensure better long-run workability and their shaped articles could have better appearance than before. However, when they are continuously worked for an extremely long period of time and when a part of them stay in the working machine for a long period of time, they are often crosslinked and thickened and are finally gelled. Therefore, it is desired to develop an EVOH resin which is yellowed little even in high-level long-run working lines and can be shaped into articles having good appearance with few fish eyes.

For preventing EVOH articles from having fish eyes, it is desired not to increase the melt viscosity of the resin composition. However, EVOH compositions of which the melt viscosity is too low are problematic in that they could not be formed into films. Even when such EVOH compositions having a low melt viscosity could be formed into films by specifically controlling the working condition for them, the films will have many voids (small bubbles) or, as the case may be, will have large-size holes, and, as a result, their appearance is extremely bad. This is because the vapor resulting from the decomposition of EVOH being worked forms voids when its amount is not so large, but forms large-size holes when its amount is large. Small voids look like gels, but actually differ from them. Concretely, gels are in the form of small hills rising from the surface of film, but contrary to these, voids are in the form of recesses caving in the surface of film.

When working lines for EVOH are temporarily suspended on weekends, in general, EVOH in the lines is purged with polyethylene and the lines are turned off. However, if a small amount of EVOH has still remained in the turned-off lines, it will be degraded while the lines are cooled or heated, and will form a gel when the lines are again turned on. The gel is problematic in that it worsens the appearance of the films or sheets formed in the thus re-turned-on lines, and a lot of time is taken until the films or sheets formed in the re-turned-on lines can have good appearance with no gel. (The gel formation is caused by the self-purging failure in the working line of EVOH.)

It is therefore desired to obtain a resin composition comprising an ethylene-vinyl alcohol copolymer, which ensures good long-run workability and good self-purgeability in working lines and which is yellowed little and can be shaped into articles having good appearance with neither voids nor holes, and also to obtain multi-layered structures comprising the resin composition.

SUMMARY OF THE INVENTION

The present invention solves the problems with the related art techniques, and attains the object as above.

In one aspect thereof, the invention provides an ethylene-vinyl alcohol copolymer resin composition, which is characterized in that the profile of its intrinsic viscosity [η] in heat treatment at 220° C. in a nitrogen atmosphere satisfies the following formulae (1) to (3), and that it contains from 0.05 to 5 μmol/g of a carboxylic acid (A) and from 2 to 25 μmol/g, in terms of the metal element, of an alkaline earth metal salt (B), and satisfies the following formula (4):

$$0.05 \leq [\eta]0 \leq 0.2 \tag{1}$$

$$0.12 \leq [\eta]10/[\eta]0 \leq 0.6 \tag{2}$$

$$0.1 \leq [\eta]60/[\eta]0 \leq 0.8 \tag{3}$$

$$0.1 \leq (a1)/(A) \leq 1.0 \tag{4}$$

wherein;

[η]0 indicates the intrinsic viscosity of the non-heated resin composition,

[η]10 indicates the intrinsic viscosity of the resin composition heated for 10 hours,

[η]60 indicates the intrinsic viscosity of the resin composition heated for 60 hours, (A) indicates the total content (μmol/g) of the carboxylic acid (A) and its salt in the resin composition, (a1) indicates the content (μmol/g) of a carboxylic acid (a1) having a molecular weight of at least 75 and its salt in the resin composition.

Preferably, the carboxylic acid (a1) having a molecular weight of at least 75 in the resin composition is a hydroxycarboxylic acid. More preferably, the carboxylic acid (a1) having a molecular weight of at least 75 therein is a lactic acid.

In another aspect thereof, the invention provides an ethylene-vinyl alcohol copolymer resin composition, which is characterized in that the profile of its intrinsic viscosity [η] in heat treatment at 220° C. in a nitrogen atmosphere satisfies the following formulae (1) to (3), and that it contains from 0.2 to 15 μmol/g of a carboxylic acid (a2) having a molecular weight of smaller than 75 and from 2 to 25 μmol/g, in terms of the metal element, of an alkaline earth metal salt (B):

$$0.05 \leq [\eta]0 \leq 0.2 \tag{1}$$

$$0.12 \leq [\eta]10/[\eta]0 \leq 0.6 \tag{2}$$

$$0.1 \leq [\eta]60/[\eta]0 \leq 0.8 \tag{3}$$

wherein;

[η]0 indicates the intrinsic viscosity of the non-heated resin composition,

[η]10 indicates the intrinsic viscosity of the resin composition heated for 10 hours,

[η]60 indicates the intrinsic viscosity of the resin composition heated for 60 hours.

Preferably, the carboxylic acid (a2) having a molecular weight of smaller than 75 in the resin composition is an acetic acid.

More preferably, the resin composition of the invention is such that the profile of its intrinsic viscosity [η] in heat treatment at 220° C. in a nitrogen atmosphere satisfies the following formulae (1') to (3'):

$$0.06 \leq [\eta]0 \leq 0.17 \tag{1'}$$

$$0.15 \leq [\eta]10/[\eta]0 \leq 0.5 \tag{2'}$$

$$0.12 \leq [\eta]60/[\eta]0 \leq 0.65 \tag{3'}$$

Also preferably, the resin composition satisfies the following formula (5):

$$0.2 \leq [\eta]60/[\eta]10 \leq 2.5 \tag{5}$$

More preferably, it satisfies the following formula (5'):

$$0.3 \leq [\eta]60/[\eta]10 \leq 2 \tag{5'}$$

Also preferably, the resin composition of the invention contains an alkaline earth metal salt (B) within a range $M_{II}$ defined by the following formulae (6) to (8):

$$X = 0.0257 \times E^2 - 2.31 \times E + 54.7 \tag{6}$$

$$Y = 0.0372 \times E^2 - 2.43 \times E + 47.7 \tag{7}$$

$$X \leq M_{II} \leq Y \tag{8}$$

wherein;

E indicates the ethylene content (mol %) of the ethylene-vinyl alcohol copolymer, $M_{II}$ indicates the content of the alkaline earth metal salt (B) (μmol/g in terms of the metal element) in the resin composition.

More preferably, it contains an alkaline earth metal salt (B) within a range $M_{II}$ defined by the following formulae (6') to (8'):

$$X' = 0.0286 \times E^2 - 2.55 \times E + 60.1 \tag{6'}$$

$$Y' = 0.0229 \times E^2 - 1.46 \times E + 31.2 \tag{7'}$$

$$X' \leq M_{II} \leq Y' \tag{8'}$$

Also preferably, the resin composition of the invention contains an alkaline earth metal salt (B), an alkali metal salt (C) and a carboxylic acid (A) within the range that satisfies the following formulae (6), (7) and (9):

$$X = 0.0257 \times E^2 - 2.31 \times E + 54.7 \tag{6}$$

$$Y = 0.0372 \times E^2 - 2.43 \times E + 47.7 \tag{7}$$

$$X \leq M_{II} + 0.12 \times M_I - 0.1 \times K \times Ac \leq Y \tag{9}$$

wherein;

E indicates the ethylene content (mol %) of the ethylene-vinyl alcohol copolymer, $M_{II}$ indicates the content of the alkaline earth metal salt (B) (μmol/g in terms of the metal element) in the resin composition, $M_I$ indicates the content of the alkali metal salt (C) (μmol/g in terms of the metal element) in the resin composition, K indicates the acid value of the carboxylic acid (A), Ac indicates the content of the carboxylic acid (A) ($\mu$mol/g) in the resin composition.

More preferably, it contains an alkaline earth metal salt (B), an alkali metal salt (C) and a carboxylic acid (A) within the range that satisfies the following formulae (6'), (7') and (9'):

$$X'=0.0286\times E^2-2.55\times E+60.1 \tag{6'}$$

$$Y'=0.0229\times E^2-1.46\times E+31.2 \tag{7'}$$

$$X'\leq M_{II}+0.12\times M_I-0.1\times K\times Ac\leq Y' \tag{9'}$$

Also preferably, the resin composition of the invention is such that its weight loss on heating for 2 hours at 230° C. in a nitrogen atmosphere falls between 5% and 35%.

Also preferably, the resin composition contains from 10 to 500 ppm, in terms of the phosphate radical, of a phosphate compound (D).

Also preferably, the resin composition contains from 50 to 2000 ppm, in terms of the boron element, of a boron compound (E).

The invention also relates to the shaped article of the resin composition.

The invention further relates to a multi-layered structure comprising at least one layer of the resin composition.

DETAILED DESCRIPTION OF THE INVENTION

Figure 1:
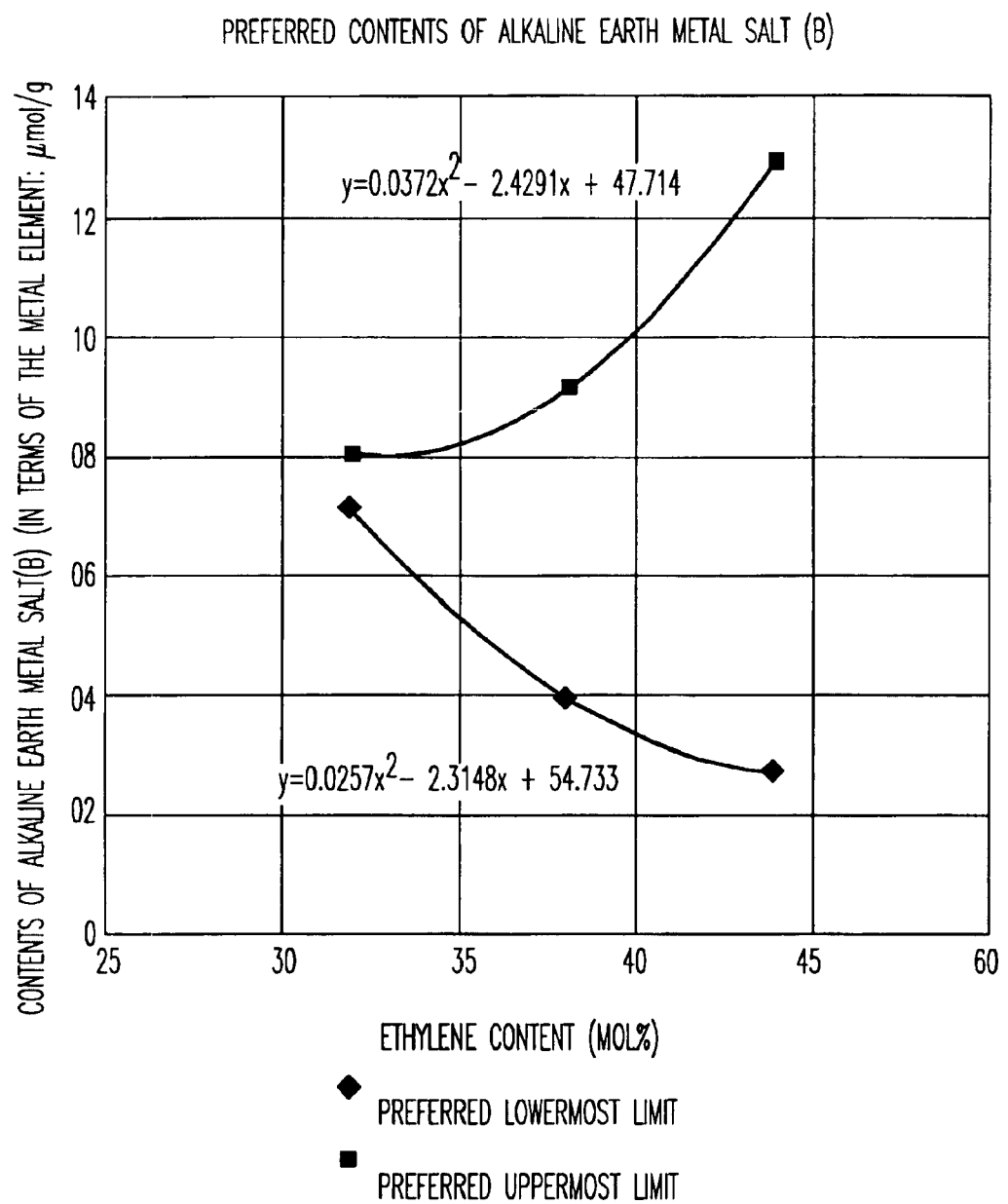
FIG. 1 is a graph showing the relationship between the ethylene content of EVOH and a preferred amount of the alkaline earth metal salt (B) to be added to EVOH.

EVOH for use in the invention is preferably obtained by saponifying an ethylene-vinyl ester copolymer. Particularly preferred is EVOH having an ethylene content of from 20 to 70 mol %. For ensuring good melt workability of the resin composition to give shaped articles with good gas-barrier properties, the ethylene content of EVOH is more preferably from 25 to 65 mol %. For ensuring high-level long-run workability and good self-purgeability to give shaped articles with few voids, the lowermost limit of the ethylene content of EVOH for use herein is preferably at least 30 mol %, more preferably at least 33 mol %, most preferably at least 36 mol %. For shaped articles having better gas-barrier properties, the uppermost limit of the ethylene content of EVOH is preferably at most 65 mol %, more preferably at most 60 mol %, most preferably at most 50 mol %. Also preferably, the degree of saponification of the vinyl ester moiety in EVOH is at least 80%. For shaped articles having better gas-barrier properties, the degree of saponification is more preferably at least 95%, even more preferably at least 99%. If the ethylene content of EVOH is larger than 70 mol %, the shaped articles will have poor gas-barrier properties and will be unsuitable to printing. If the degree of saponification of the vinyl ester moiety in EVOH is smaller than 80%, the gas-barrier properties, the thermal stability and the moisture resistance of the shaped articles will be all poor.

One preferred example of vinyl esters to be copolymerized with ethylene for EVOH for use herein is vinyl acetate, which, however, is not limitative. Any other vinyl esters of fatty acids (e.g., vinyl propionate, vinyl pivalate) are also usable herein. EVOH may contain from 0.0002 to 0.2 mol % of a vinylsilane compound serving as a comonomer. The vinylsilane compound includes, for example, vinyltrimethoxysilane, vinyltriethoxysilane, vinyltri($\beta$-methoxyethoxy)silane and $\gamma$-methacryloxypropylmethoxysilane. Of those, preferred are vinyltrimethoxysilane and vinyltriethoxysilane.

The method of producing EVOH for use in the invention is described concretely. To produce it, for example, ethylene is copolymerized with a vinyl ester in any desired manner including not only solution polymerization but also suspension polymerization, emulsion polymerization and bulk polymerization, and in any desired mode of continuous or batchwise polymerization. One example of batchwise solution polymerization to produce the polymer is described, for which the polymerization condition is as follows.

Solvent:

Alcohols are preferred, but any other organic solvents (e.g., dimethylsulfoxide) capable of dissolving ethylene, vinyl esters and ethylene-vinyl ester copolymers may also be used. Alcohols usable herein include, for example, methyl alcohol, ethyl alcohol, propyl alcohol, n-butyl alcohol and t-butyl alcohol. Especially preferred is methyl alcohol.

Catalyst:

Usable are azonitrile-type initiators such as 2,2-azobisisobutyronitrile, 2,2-azobis-(2,4-dimethylvaleronitrile), 2,2-azobis-(4-methyl-2,4-dimethylvaleronitrile), 2,2-azobis-(4-methoxy-2,4-dimethylvaleronitrile), and 2,2-azobis-(2-cyclopropylpropionitrile); organic peroxide-type initiators such as isobutyryl peroxide, cumyl peroxyneodecanoate, diisopropyl peroxycarbonate, di-n-propyl peroxydicarbonate, t-butyl peroxyneodecanoate, lauroyl peroxide, benzoyl peroxide, and t-butyl hydroperoxide.

Temperature:

20 to 90° C., preferably 40 to 70° C.

Time:

2 to 15 hours, preferably 3 to 11 hours.

Degree of Polymerization:

10 to 90%, preferably 30 to 80% based on the vinyl ester fed into the reactor.

Resin Content of the Solution after Polymerization:

5 to 85%, preferably 20 to 70%.

Except for ethylene and vinyl esters, any other minor comonomers capable of copolymerizing with them may be present in the polymerization system. The comonomers include, for example, $\alpha$-olefins such as propylene, isobutylene, $\alpha$-octene, and $\alpha$-dodecene; unsaturated acids such as acrylic acid, methacrylic acid, crotonic acid, maleic acid and itaconic acid, and their anhydrides, salts, or mono- or di-alkyl esters; nitriles such as acrylonitrile, and methacrylonitrile; amides such as acrylamide, and methacrylamide; olefinsulfonic acids such as ethylenesulfonic acid, allylsulfonic acid and methallylsulfonic acid, and their salts; alkyl vinyl ethers, vinyl ketones, N-vinylpyrrolidone, vinyl chloride, and vinylidene chloride.

After the monomers have been polymerized for a predetermined period of time to give the intended copolymer having a predetermined degree of polymerization, a polymerization inhibitor may be added thereto, if desired. Then, the non-reacted ethylene gas is evaporated away, and the non-reacted vinyl ester is purged away. To purge the non-reacted vinyl ester away from the ethylene-vinyl ester copolymer from which ethylene has been evaporated away, for example, the copolymer solution is continuously run into a column filled with raschig rings, in the downward direction at a constant flow rate, while a vapor of an organic solvent such as methanol is jetted into the column from its bottom, whereby a mixed vapor of the organic solvent and the non-reacted vinyl ester is run off from the column through its top, and the copolymer solution from which the non-reacted vinyl ester has been removed is taken out of the column through its bottom.

An alkali catalyst is added to the copolymer solution from which the non-reacted vinyl ester has been removed, and it saponifies the vinyl ester moiety of the copolymer. For this, employable is any of continuous or batchwise saponification. The alkali catalyst includes, for example, sodium hydroxide, potassium hydroxide, and alkali metal alcoholates. One example of batchwise saponification is described, for which the condition is as follows.

Concentration of Copolymer Solution:
  10 to 50%.
Reaction Temperature:
  30 to 60° C.
Amount of Catalyst to be used:
  0.02 to 0.6 equivalents (based on the vinyl ester moiety).
Time:
  1 to 6 hours.

The degree of saponification of the saponified copolymer will vary, depending on the use of the copolymer, but is preferably at least 80% of the vinyl ester moiety, more preferably at least 95% thereof, even more preferably at least 99% thereof. The degree of saponification can be varied in any desired manner by controlling the condition for saponification.

After having been thus processed, the resulting ethylene vinyl alcohol copolymer (EVOH) is optionally but preferably neutralized and then washed to remove the alkali catalyst, by-produced salts and other impurities therefrom.

The method of adding a carboxylic acid (A), an alkaline earth metal salt (B), and optionally an alkali metal salt (C), a phosphate compound (D) and a boron compound (E) to EVOH for preparing the EVOH resin composition of the invention is not specifically defined. For example, employable is any of a method of dipping EVOH in a solution of the additive compounds; a method of melting EVOH followed by adding the additive compounds to the EVOH melt; and a method of dissolving EVOH in a suitable solvent followed by mixing the EVOH solution with the additive compounds.

The method of dipping EVOH in a solution of the additive compounds may be effected in any mode of batch operation or continuous operation. In the method, the morphology of EVOH is not limited, including, for example, powders, granules, spherical pellets, and columnar pellets. In the method, the concentration of each additive compound is not specifically defined, and the solvent for the solution of the additive compounds is also not specifically defined. In view of its handlability, preferred is an aqueous solution. The dipping time will vary, depending on the morphology of EVOH, but is preferably not shorter than 1 hour, more preferably not shorter than 2 hours, for EVOH pellets having a size of from 1 to 10 mm or so.

Regarding the dipping treatment of EVOH in the solution of the additive compounds, EVOH may be dipped in a plurality of different solutions separately containing any of the compounds, or may be dipped in one solution containing all the compounds. In particular, especially preferred is dipping EVOH in one solution containing all the compounds. After having been dipped in the solution, EVOH is finally dried and the intended EVOH composition is thus obtained.

The resin composition of the invention is specifically characterized in that the profile of its intrinsic viscosity $[\eta]$ in heat treatment at 220° C. in a nitrogen atmosphere satisfies the following formulae (1) to (3):

$$0.05 \leq [\eta]0 \leq 0.2 \tag{1}$$

$$0.12 \leq [\eta]10/[\eta]0 \leq 0.6 \tag{2}$$

$$0.1 \leq [\eta]60/[\eta]0 \leq 0.8 \tag{3}$$

wherein;
  $[\eta]0$ indicates the intrinsic viscosity of the non-heated resin composition,
  $[\eta]10$ indicates the intrinsic viscosity of the resin composition heated for 10 hours,
  $[\eta]60$ indicates the intrinsic viscosity of the resin composition heated for 60 hours.

Preferably, it satisfies the following formulae (1') to (3'):

$$0.06 \leq [\eta]0 \leq 0.17 \tag{1'}$$

$$0.15 \leq [\eta]10/[\eta]0 \leq 0.5 \tag{2'}$$

$$0.12 \leq [\eta]60/[\eta]0 \leq 0.65 \tag{3'}$$

more preferably, the following formulae (1") to (3"):

$$0.07 \leq [\eta]0 \leq 0.15 \tag{1"}$$

$$0.2 \leq [\eta]10/[\eta]0 \leq 0.45 \tag{2"}$$

$$0.15 \leq [\eta]60/[\eta]0 \leq 0.5 \tag{3"}$$

$[\eta]0$ indicates the intrinsic viscosity of the non-heated EVOH resin composition. If its $[\eta]0$ is smaller than 0.05, the shapability of the resin composition is poor. If its $[\eta]0$ is larger than 0.2, the shapability of the resin composition is also poor.

$[\eta]10/[\eta]0$ is the ratio of the intrinsic viscosity of the EVOH resin composition heated for 10 hours to the intrinsic viscosity of the non-heated EVOH resin composition. If the ratio is smaller than 0.12 (this means that the intrinsic viscosity of the composition greatly lowers after heat treatment), much gas produced by rapid decomposition of EVOH worsens the appearance of the shaped articles of the composition. In particular, films of the composition are problematic in that they have many voids and holes. On the other hand, if the ratio is larger than 0.6 (this means that the decrease in the intrinsic viscosity of the heated resin composition is small), the long-run workability and the self-purgeability of the resin composition are poor.

$[\eta]60/[\eta]0$ is the ratio of the intrinsic viscosity of the EVOH resin composition heated for 60 hours to the intrinsic viscosity of the non-heated EVOH resin composition. Satisfying the formula (3), the resin composition does not gel and is readily extruded out of extruders even when it is continuously processed for a long period of time in a complicated machine having a number of resin residence zones in which the resin being processed stays for a relatively long period of time. Therefore, the resin composition is prevented from being thermally deteriorated even when processed in such a complicated machine, and its shaped articles can have good appearance with few fish eyes. However, if the ratio $[\eta]60/[\eta]0$ is smaller than 0.1, much gas produced by rapid decomposition of EVOH worsens the appearance of the shaped articles of the composition. In particular, films of the composition are problematic in that they have many voids and holes. On the other hand, if the ratio is larger than 0.8 (this means that the decrease in the intrinsic viscosity of the heated resin composition is small), the resin composition staying in the resin residence zones in long-run working lines often gels, and therefore the long-run workability and the self-purgeability of the resin composition are poor.

Preferably, the resin composition of the invention satisfies the following formula (5):

$$0.2 \leq [\eta]60/[\eta]10 \leq 2.5 \quad (5),$$

more preferably, $$0.3 \leq [\eta]60/[\eta]10 \leq 2 \quad (5'),$$

even more preferably, $$0.5 \leq [\eta]60/[\eta]10 \leq 1.7 \quad (5'').$$

Satisfying the formula (5), the intrinsic viscosity change of the resin composition is small even in long-run working lines, and the resin composition has good shapability. Specifically, the viscosity difference between the resin composition staying in the resin residence zones and that flowing in the resin flow zones in long-run working lines does not increase so much, and therefore does not cause resin flow disorder in the working lines, and, as a result, the resin composition can be stably processed in the working lines and can be shaped into good articles. If, however, the ratio $[\eta]60/[\eta]10$ is smaller than 0.2, much gas produced by rapid decomposition of EVOH may worsen the appearance of the shaped articles of the composition. In particular, films of the composition may be problematic in that they have many voids and holes. On the other hand, if the ratio is larger than 2.5, the long-run workability and the self-purgeability of the resin composition may be poor.

The carboxylic acid (A) to be in the resin composition of the invention preferably has a pKa at 25° C. of at least 3.5. Carboxylic acids having a pKa at 25° C. of smaller than 3.5 are unfavorable to the invention, since they could not well control the pH of the resin composition, and since the resin composition containing such a carboxylic acid will be often yellowed and its interlayer adhesiveness will be poor.

The carboxylic acid (A) is grouped into two, one being a carboxylic acid (a1) having a molecular weight of at least 75, and the other being a carboxylic acid (a2) having a molecular weight of smaller than 75. The carboxylic acid (a1) having a molecular weight of at least 75 includes, for example, succinic acid, adipic acid, benzoic acid, capric acid, lauric acid, glycolic acid, and lactic acid. In case where a dicarboxylic acid such as succinic acid or adipic acid is used, the shaped articles of the resin composition may have fish eyes. As opposed to this, a hydroxycarboxylic acid such as glycolic acid or lactic acid is preferred, as being free from such problems and having good solubility in water. Especially preferred is lactic acid. More preferably, the carboxylic acid (a1) has a molecular weight of at least 80, even more preferably at least 85, still more preferably at least 90. It is desirable to add such a carboxylic acid having a higher molecular weight to the resin composition, since, in the resin composition, the amount of the volatile component that may evaporate while the resin composition is processed could be reduced, and the resin composition smells little and has good long-run workability.

For the carboxylic acid (a1) having a molecular weight of at least 75, preferred is lactic acid. This is because lactic acid is well soluble in water, as so mentioned hereinabove, and, in addition, its volatility is extremely small as compared with that of acetic acid. When the EVOH resin composition is pelletized, in general, its wet pellets are dried. In the drying step, the acid component, lactic acid in the wet pellets evaporates little, and the dried pellets can have more stable quality. In addition, the acidity of lactic acid (its pKa at 25° C. is 3.858) is higher than that of acetic acid (its pKa at 25° C. is 4.756). Therefore, the necessary amount of the acid component, lactic acid to be in the EVOH resin composition may be small. The advantages of using such low-volatile lactic acid in the EVOH resin composition are that the necessary amount of the acid to be in the composition may be small and that the acid can be surely prevented from running away from the reaction system of the composition being produced. Accordingly, the load to the operators who are in charge of producing the composition can be well reduced, and, in addition, the load to the surroundings around the production equipment (factories, etc.) can be also well reduced.

The carboxylic acid (a2) having a molecular weight of smaller than 75 includes, for example, formic acid, acetic acid, and propionic acid. Especially preferred is acetic acid, since it is inexpensive and its acidity is suitable for use herein, and since the pH of the resin composition containing it is easy to control.

In the first aspect of the invention, the content of the carboxylic acid (A) in the resin composition falls between 0.05 and 5 $\mu$mol/g. If the content of the carboxylic acid (A) therein is smaller than 0.05 $\mu$mol/g, the resin composition will be strongly yellowed when melted. If, on the other hand, the content is larger than 5 $\mu$mol/g, the resin composition will much smell, and, in addition, its adhesiveness to adhesive resins in co-extrusion may be poor, and it will much adhere to dies. The lowermost limit of the content of the carboxylic acid (A) in the resin composition is preferably at least 0.1 $\mu$mol/g, more preferably at least 0.2 $\mu$mol/g. The uppermost limit of the content of the carboxylic acid (A) therein is preferably at most 4 $\mu$mol/g, more preferably at most 3 $\mu$mol/g, even more preferably at most 2 $\mu$mol/g, most preferably at most 1.5 $\mu$mol/g.

In the first aspect of the invention, the resin composition satisfies the following formula (4):

$$0.1 \leq (a1)/(A) \leq 1.0 \quad (4)$$

wherein;
- (A) indicates the total content ($\mu$mol/g) of the carboxylic acid (A) and its salt in the resin composition, and
- (a1) indicates the content ($\mu$mol/g) of the carboxylic acid (a1) having a molecular weight of at least 75 and its salt in the resin composition.

As in formula (4), the lowermost limit of the ratio (a1)/(A) is at least 0.1. If the ratio (a1)/(A) is smaller than 0.1, the resin composition will much smell. Preferably, the lowermost limit of the ratio (a1)/(A) is at least 0.5, more preferably at least 0.7, even more preferably at least 0.9, still more preferably at least 0.95, most preferably at least 0.98.

In the second aspect of the invention, the resin composition contains from 0.2 to 15 $\mu$mol/g of a carboxylic acid (a2) having a molecular weight of smaller than 75. If the content of the carboxylic acid (a2) is smaller than 0.2 $\mu$mol/g therein, the resin composition will be strongly yellowed when melted. If, on the other hand, the content is larger than 15 $\mu$mol/g, the adhesiveness of the resin composition to adhesive resins in co-extrusion may be poor, and, in addition, the resin composition will much adhere to dies. The lowermost limit of the content of the carboxylic acid (a2) in the resin composition is preferably at least 0.5 $\mu$mol/g, more preferably at least 0.8 $\mu$mol/g. The uppermost limit of the content of the carboxylic acid (a2) therein is preferably at most 10 $\mu$mol/g, more preferably at most 5 $\mu$mol/g.

The carboxylic acid (a2) having a molecular weight of smaller than 75 for use in the invention includes, for example, formic acid, acetic acid, and propionic acid. Especially preferred is acetic acid, since it is inexpensive and its acidity is suitable for use herein, and since the pH of the resin composition containing it is easy to control.

The resin composition of the invention contains from 2 to 25 µmol/g, in terms of the metal element, of an alkaline earth metal salt (B). The alkaline earth metal salt (B) is not specifically defined, for which, however, preferred are magnesium salts, calcium salts, barium salts, and beryllium salts. More preferred are magnesium salts and calcium salts. The anion of the alkaline earth metal salt (B) is not also specifically defined. Preferred are acetate, lactate and phosphate anions; and more preferred are lactate anions.

Preferably, the content ($M_{II}$) of the alkaline earth metal salt (B) in the resin composition falls between 2.5 and 20 µmol/g. If the content of the alkaline earth metal salt (B) therein is smaller than 2 µmol/g, the long-run workability of the resin composition will be poor; but if larger than 25 µmol/g, the resin composition will be much yellowed when melted, and its shaped articles will have many voids and holes.

The resin composition of the invention is specifically characterized in that, when it is processed in melt to form shaped articles, its intrinsic viscosity is well lowered not forming voids in the shaped articles, and that the thus-lowered intrinsic viscosity of the composition being processed does not increase too much even in long-run working lines. To ensure the effect of the invention, the amount of the alkaline earth metal salt (B) to be in the resin composition must be specifically controlled. Through our careful studies, we, the present inventors have clarified a close relationship between the alkaline earth metal salt content of the resin composition and the ethylene content of EVOH in the resin composition.

Precisely, we have found that the necessary content of the alkaline earth metal salt (B) to be in the resin composition shall increase with the decrease in the ethylene content of EVOH in the resin composition, in order that the lowered intrinsic viscosity of the resin composition being processed in melt does not increase too much even in long-run working lines. However, if the content of the alkaline earth metal salt (B) in the resin composition increases too much, it is often difficult to lower the intrinsic viscosity of the melt of the resin composition without forming many voids in the shaped articles of the resin composition. This tendency is more remarkable when the ethylene content of EVOH in the resin composition decreases more.

Based on the results of our studies as above, obtained are preferred contents, relative to the ethylene content of EVOH therein, of the alkaline earth metal salt to be in the resin composition capable of attaining the intended effect as above. These are shown in Table 1 below.

Preferred data in Table 1 are plotted in a graph of which the horizontal axis indicates the ethylene content of EVOH and the vertical axis indicates the content of the alkaline earth metal salt (B), as in FIG. 1. The graph shows the relationship between the ethylene content of EVOH in the resin composition and the preferred lowermost and uppermost limits of the content of the alkaline earth metal salt (B) therein.

From the thus-plotted data, the relationship between the ethylene content of EVOH in the resin composition and the preferred lowermost limit (X) and uppermost limit (Y) of the content of the alkaline earth metal salt (B) therein is approximated to a quadratic -equation, as in the following formulae (6) to (8):

$$X = 0.0257 \times E^2 - 2.31 \times E + 54.7 \tag{6}$$

$$Y = 0.0372 \times E^2 - 2.43 \times E + 47.7 \tag{7}$$

$$X \leq M_{II} \leq Y \tag{8}$$

wherein;

E indicates the ethylene content (mol %) of the ethylene-vinyl alcohol copolymer (EVOH), and $M_{II}$ indicates the content of the alkaline earth metal salt (B) (µmol/g in terms of the metal element) in the resin composition.

Figure 2:
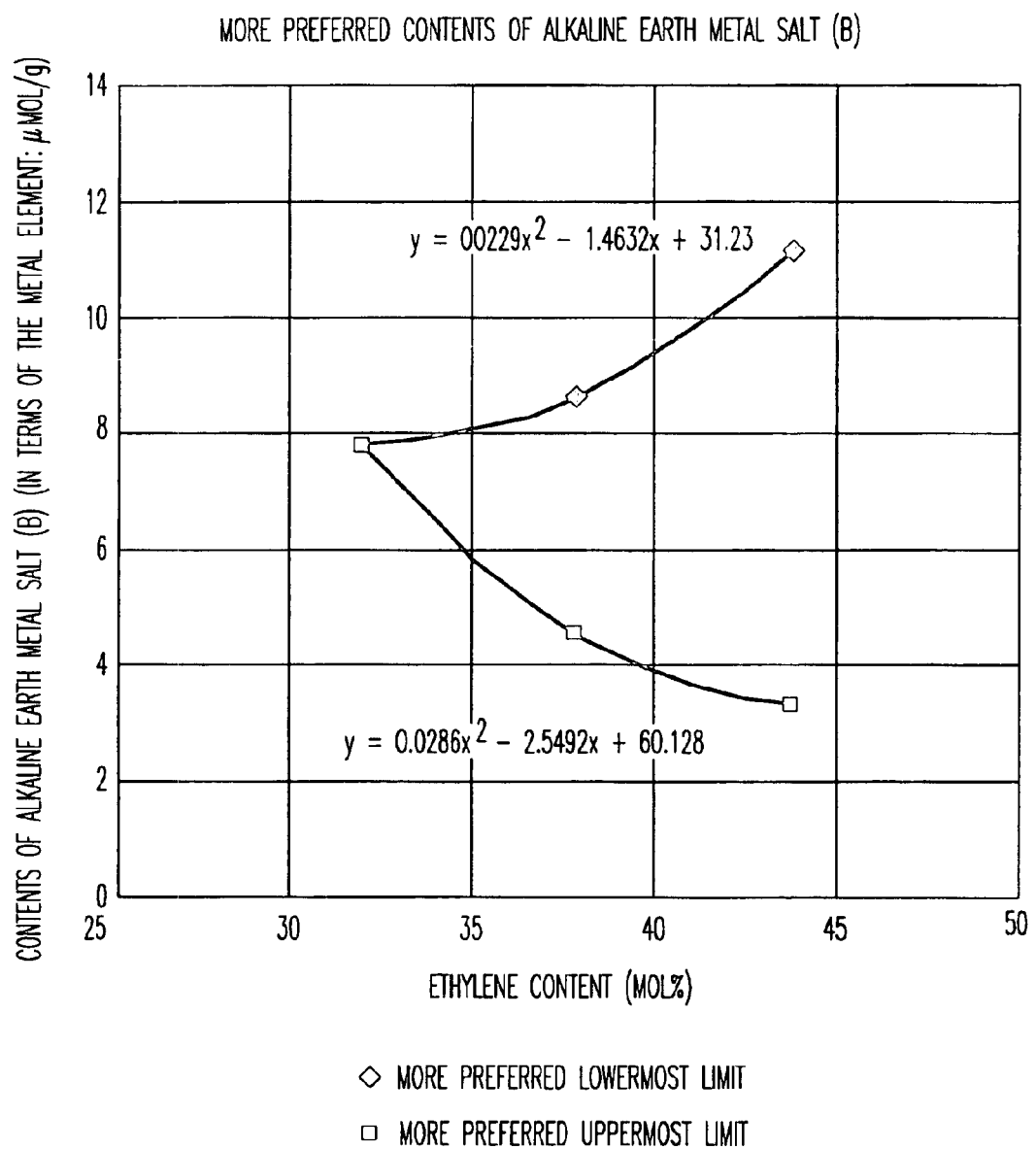
FIG. 2 is a graph showing the relationship between the ethylene content of EVOH and a more preferred amount of the alkaline earth metal salt (B) to be added to EVOH.

Similarly, more preferred data in Table 1 are plotted in a graph of which the horizontal axis indicates the ethylene content of EVOH and the vertical axis indicates the content of the alkaline earth metal salt (B), as in FIG. 2. The graph shows the relationship between the ethylene content of EVOH in the resin composition and the more preferred lowermost and uppermost limits of the content of the alkaline earth metal salt (B) therein.

From the thus-plotted data, the relationship between the ethylene content of EVOH in the resin composition and the more preferred lowermost limit (X') and uppermost limit (Y') of the content of the alkaline earth metal salt (B) therein is approximated to a quadratic equation, as in the following formulae (6') to (8'):

$$X' = 0.0286 \times E^2 - 2.55 \times E + 60.1 \tag{6'}$$

$$Y' = 0.0229 \times E^2 - 1.46 \times E + 31.2 \tag{7'}$$

$$X' \leq M_{II} \leq Y' \tag{8'}$$

wherein;

E indicates the ethylene content (mol %) of the ethylene-vinyl alcohol copolymer (EVOH), and

TABLE 1

Preferred Contents of Alkaline Earth Metal Salt (B)

Content of Alkaline Earth Metal Salt (B)(*1)

| Ethylene Content of EVOH (mol %) | preferred lowermost limit | preferred uppermost limit | more preferred lowermost limit | more preferred uppermost limit | even more preferred lowermost limit | even more preferred uppermost limit |
|---|---|---|---|---|---|---|
| 32 | 6.99 | 8.02 | 7.82 | 7.82 | 7.82 | 7.82 |
|  | (170) | (195) | (190) | (190) | (190) | (190) |
| 38 | 3.91 | 9.05 | 4.52 | 8.64 | 5.35 | 8.64 |
|  | (95) | (220) | (110) | (210) | (130) | (210) |
| 44 | 2.67 | 12.75 | 3.29 | 11.11 | 3.29 | 11.11 |
|  | (65) | (310) | (80) | (270) | (80) | (270) |

(*1)This is in terms of the metal element in the salt, and its unit is µmol/g. The data parenthesized correspond to the content (ppm) of the salt (B) of magnesium only.

$M_{II}$ indicates the content of the alkaline earth metal salt (B) (μmol/g in terms of the metal element) in the resin composition.

Also similarly, the relationship between the ethylene content of EVOH in the resin composition and the even more preferred lowermost limit (X") and uppermost limit (Y") of the content of the alkaline earth metal salt (B) therein is approximated to a quadratic equation, as in the following formulae (6") to (8"):

$$X''=0.00572 \times E^2 - 0.811 \times E + 27.9 \qquad (6'')$$

$$Y''=0.0229 \times E^2 - 1.46 \times E + 31.2 \qquad (7'')$$

$$X'' \leq M_{II} \leq Y'' \qquad (8'')$$

wherein;

E indicates the ethylene content (mol %) of the ethylene-vinyl alcohol copolymer (EVOH), and $M_{II}$ indicates the content of the alkaline earth metal salt (B) (μmol/g in terms of the metal element) in the resin composition.

Preferably, the resin composition of the invention contains from 10 to 1000 ppm, in terms of the metal element, of an alkali metal salt (C) for further improving the adhesiveness of the composition. The lowermost limit of the content of the alkali metal salt (C) in the resin composition is preferably 30 ppm, more preferably 50 ppm; and the uppermost limit thereof is preferably 750 ppm, more preferably 500 ppm, most preferably 300 ppm. The alkali metal salt (C) is not specifically defined, for which, however, preferred are sodium salts and potassium salts. The anion of the alkali metal salt (C) is not also specifically defined. Preferred are acetate, lactate and phosphate anions; and more preferred are lactate anions.

When the content of the alkali metal salt (C) in the composition is smaller than 10 ppm, the adhesiveness of the composition may be poor; but when the content is larger than 1000 ppm, the yellowing resistance of the melted composition may be poor.

As so mentioned hereinabove, it is a matter of great importance to appropriately define the content of the alkaline earth metal salt (B) to be in the resin composition of the invention, in order that the resin composition can ensure good long-run workability and good self-purgeability. Through our careful studies, we, the present inventors have further found that the alkali metal salt (C) and the carboxylic acid (A) added to the resin composition also have some influences on the properties of the resin composition, though not so significant as the alkaline earth metal salt (B) added thereto. Specifically, we have found that the alkali metal salt (C) in the resin composition augments the effect of the alkaline earth metal salt (B) therein, therefore lowering the intrinsic viscosity [η] of the resin composition in heat treatment at 220° C. in a nitrogen atmosphere; while, on the other hand, the carboxylic acid (A) in the resin composition retards the activity of the alkaline earth metal salt (B) therein, therefore increasing the intrinsic viscosity [η] of the resin composition in heat treatment at 220° C. in a nitrogen atmosphere.

To make EVOH have various characteristics as above, a carboxylic acid (A) and/or an alkali metal salt (C) are/is added thereto. Through our careful studies, we, the present inventors have found that a carboxylic acid (A), an alkaline earth metal salt (B) and an alkali metal salt (C) are added to EVOH preferably within the range that satisfies the following formulae (6), (7) and (9), in order that the resin composition containing them can fully attain the object of the invention.

$$X=0.0257 \times E^2 - 2.31 \times E + 54.7 \qquad (6)$$

$$Y=0.0372 \times E^2 - 2.43 \times E + 47.7 \qquad (7)$$

$$X \leq M_{II} + 0.12 \times M_I - 0.1 \times K \times Ac \leq Y \qquad (9)$$

wherein;

E indicates the ethylene content (mol %) of the ethylene-vinyl alcohol copolymer (EVOH), $M_{II}$ indicates the content of the alkaline earth metal salt (B) (μmol/g in terms of the metal element) in the resin composition, $M_I$ indicates the content of the alkali metal salt (C) (μmol/g in terms of the metal element) in the resin composition, K indicates the acid value of the carboxylic acid (A), Ac indicates the content of the carboxylic acid (A) (μmol/g) in the resin composition.

More preferably, the range of the additive compounds satisfies the following formulae (6'), (7') and (9'):

$$X'=0.0286 \times E^2 - 2.55 \times E + 60.1 \qquad (6')$$

$$Y'=0.0229 \times E^2 - 1.46 \times E + 31.2 \qquad (7')$$

$$X' \leq M_{II} + 0.12 \times M_I - 0.1 \times K \times Ac \leq Y' \qquad (9'),$$

even more preferably, $$X'=0.00286 \times E^2 - 0.543 \times E + 21.0 \qquad (6'')$$

$$Y'=0.0229 \times E^2 - 1.46 \times E + 31.2 \qquad (7'')$$

$$X' \leq M_{II} + 0.12 \times M_I - 0.1 \times K \times Ac \leq Y' \qquad (9'').$$

In the first aspect of the invention, the resin composition contain a specific amount of a high-boiling-point carboxylic acid (a1) having a molecular weight of at least 75. Therefore, even in long-run melt-processing operation, it can be shaped into good articles having good yellowing resistance and good appearance. In view of the production costs and the productivity, the absence of a phosphate compound (D) in the resin composition will be often desirable. However, adding a phosphate compound (D) to the resin composition will further improve the long-run workability and the recyclability of the resin composition. In particular, when the resin composition is processed in long-run operation that will continue for a few days or more or when it undergoes repeated heat history of repeated heat cycles (for example, when its shaped articles are recycled), the phosphate compound (D), if any, therein will be significantly effective in improving the yellowing resistance of the composition.

Preferably, the amount of the phosphate compound (D) to be added to the resin composition falls between 10 and 500 ppm in terms of the phosphate radical, more preferably between 10 and 200 ppm, even more preferably between 20 and 150 ppm. Containing a phosphate compound (D) within the range, the resin composition may have higher yellowing resistance and better long-run workability and may be shaped into articles having better appearance. However, if the content of the phosphate compound (D) therein is smaller than 10 ppm, the resin composition will be yellowed when it is processed in melt, and its shaped articles will have poor appearance. In particular, the problem with it will be more serious when the resin composition is subjected to repeated heat history (repeated heat cycles), and, as a result, its recyclability will be poor. On the other hand, if the content of the phosphate compound (D) therein is over 500 ppm, the shaped articles of the resin composition will have many fish eyes and their appearances will be poor. The phosphate compound (D) includes, for example, various acids such as phosphoric acid and phosphorous acid, and their salts, but is not limited to them. Any phosphate of any type of primary phosphates, secondary phosphates and tertiary phosphates may be in the resin composition, and its cation is not specifically defined. Preferred are alkali metal salts and alkaline earth metal salts such as those mentioned hereinabove for (C) and (B), respectively. Above all, especially preferred is any of sodium dihydrogenphosphate, potassium dihydrogenphosphate, disodium hydrogenphosphate or dipotassium hydrogenphosphate as the phosphate compound (D) to be in the resin composition.

Also preferably, the resin composition of the invention contains from 50 to 2000 ppm, in terms of the boron element, of a boron compound (E). The boron compound (E) includes, for example, boric acids, esters of boric acids, salts of boric acids and boron hydrides, but is not limited to them. Concretely, the boric acids include orthoboric acid, metaboric acid, and tetraboric acid; the esters of boric acids include triethyl borate, and trimethyl borate; the salts of boric acids include alkali metal salts and alkaline metal salts of various types of boric acids such as those mentioned above for the components (C) and (B), respectively, as well as borax. Of those compounds, especially preferred is orthoboric acid (this will be hereinafter referred to as boric acid). The EVOH resin composition containing such a boron compound (E) can have increased melt viscosity even when EVOH therein has a low degree of polymerization. The advantage of the EVOH resin composition in which EVOH has a low degree of polymerization is that it can be shaped into better articles with fewer fish eyes and it has better long-run workability than ordinary EVOH resin compositions. In case where the resin composition of the invention contains a boron compound (E), the resin deposition around dies in long-run melt-processing operation that will continue for a few days or more will occur in some degree, but the shaped articles of the resin composition have few fish eyes. The lowermost limit of the boron compound (E) to be in the resin composition is preferably at least 50 ppm, more preferably at least 100 ppm, even more preferably at least 150 ppm. The uppermost limit thereof is preferably at most 1500 ppm, more preferably at most 1000 ppm. If the content of the boron compound (E) in the resin composition is smaller than 50 ppm, fish eyes may increase in the shaped articles with the increase in the processing time. If so, therefore, the shaped articles will have poor appearance when produced in long-run processing operation. On the other hand, however, if the content of the boron compound (E) therein is larger than 2000 ppm, the resin composition will readily gel, and will often fail to be shaped into good articles.

Preferably, the weight loss of the resin composition heated at 230° C. in a nitrogen atmosphere for 2 hours falls between 5 and 35%. If the weight loss is smaller than 5%, the long-run workability and the self-purgeability of the resin composition will be poor. However, if the weight loss is larger than 35%, much gas will be produced by decomposition of EVOH, and it will cause voids in the shaped articles.

Before processed in melt, if desired, the resin composition of the invention may be blended with different types of EVOHs each having a different degree of polymerization, a different ethylene content and a different degree of saponification, within the range not interfering with the object of the invention. Also if desired, a suitable amount of various plasticizers, stabilizers, surfactants, colorants, UV absorbents, slip agents, antistatic agents, drying agents, crosslinking agents, metal salts, fillers, and reinforcing agents such as various fibers may be added to the resin composition.

Also if desired, a suitable amount of any other thermoplastic resins may be added to the resin composition. Other thermoplastic resins that may be added to the resin composition include, for example, various types of polyolefins (e.g., polyethylene, polypropylene, poly-1-butene, poly-4-methyl-1-pentene, ethylene-propylene copolymers, copolymers of ethylene with a-olefins having at least 4 carbon atoms, polyolefin-maleic anhydride copolymers, ethylene-vinyl ester copolymers, ethylene-acrylate copolymers, and also modified polyolefins prepared by graft-modifying such polymers or copolymers with unsaturated carboxylic acids or their derivatives), various types of nylons (e.g., nylon-6, nylon-6,6, nylon-6/6,6 copolymers), and also polyvinyl chlorides, polyvinylidene chlorides, polyesters, polystyrenes, and modified polyvinyl alcohol resins.

The resin composition of the invention obtained in the manner as above is used for various shaped articles. One typical example of its applications is for pellets. The resin composition of the invention may be shaped in melt into various articles such as films, sheets, containers, pipes and fibers. The shaped articles can be recycled by grinding and re-shaping them. The films, sheets and fibers of the composition may be uniaxially or biaxially stretched. For processing the composition in melt, employable is any mode of extrusion, inflation extrusion, blow molding, melt spinning or injection molding. The temperature at which the resin composition to be shaped is melted varies, depending on the melting point of EVOH in the composition, but preferably falls between 150 and 270° C. or so.

The resin composition of the invention may be shaped into single-layered structures of the composition alone, but, in practical use, it is often shaped into multi-layered structures comprising at least one layer of the composition in which the layer of the composition may be in any form of film, sheet or the like. The layer constitution of the multi-layered structures includes, for example, E/Ad/T and T/Ad/E/Ad/T, in which E indicates the resin composition of the invention, Ad indicates an adhesive resin, and T indicates a thermoplastic resin. However, these are not limitative. In the multi-layered structures, each layer may be single-layered, or, as the case may be, multi-layered.

The method of producing the multi-layered structures as above is not specifically defined. For example, employable are a method of melt-extruding a thermoplastic resin onto a shaped article (e.g., film, sheet) of the resin composition; a method of co-extruding the EVOH resin composition along with any other thermoplastic resin onto a substrate of a thermoplastic resin; a method of co-injecting the resin composition along with any other thermoplastic resin; a method of laminating films or sheets of a shaped article of the resin composition and any other substrate via a known adhesive of, for example, organotitanium compounds, isocyanate compounds or polyester compounds therebetween. Of those, preferred is the method of co-extruding the resin composition along with any other thermoplastic resin.

The thermoplastic resin that may be combined with the resin composition of the invention includes, for example, homopolymers or copolymers of olefins such as linear low-density polyethylenes, low-density polyethylenes, middle-density polyethylenes, high-density polyethylenes, ethylene-vinyl acetate copolymers, ethylene-propylene copolymers, polypropylenes, propylene-α-olefin copolymers (in which the α-olefin has from 4 to 20 carbon atoms), polybutenes, and polypentenes; polyesters such as polyethylene terephthalates; polyester elastomers; polyamide resins such as nylon-6 and nylon-6,6; as well as polystyrenes, polyvinyl chlorides, polyvinylidene chlorides, acrylic resins, vinyl ester resins, polyurethane elastomers, polycarbonate, chloropolyethylenes, and chloropolypropylenes. Of those, preferred are polypropylenes, polyethylenes, ethylene-propylene copolymers, ethylene-vinyl acetate copolymers, polyamides, polystyrenes, and polyesters.

In case where the resin composition of the invention is layered with a thermoplastic resin in a mode of coextrusion, an adhesive resin may be used therebetween. In that case, the adhesive resin preferably comprises a carboxylic acid-modified polyolefin. The carboxylic acid-modified polyolefin is preferably a carboxyl group-having, modified olefinic polymer that may be prepared by chemically bonding an ethylenic unsaturated carboxylic acid or its anhydride to an olefinic polymer, for example, through addition reaction or grafting reaction. The olefinic polymer includes, for example, polyolefins such as polyethylenes (produced in low-pressure, middle-pressure or high-pressure process), linear low-density polyethylenes, polypropylenes, polybutenes; copolymers of olefins with comonomers capable of copolymerizing with olefins (e.g., vinyl esters, unsaturated carboxylates), such as ethylene-vinyl acetate copolymers and ethylene-ethyl acrylate copolymers. Of those, preferred are linear low-density polyethylenes, ethylene-vinyl acetate copolymers (having a vinyl acetate content of from 5 to 55% by weight), and ethylene-ethyl acrylate copolymers (having an ethyl acrylate content of from 8 to 35% by weight); and more preferred are linear low-density polyethylenes and ethylene-vinyl acetate copolymers. The ethylenic unsaturated carboxylic acid and its anhydride include, for example, ethylenic unsaturated monocarboxylic acids and their esters, ethylenic unsaturated dicarboxylic acids and their mono- or di-esters and anhydrides. Of those, preferred are ethylenic unsaturated dicarboxylic acid anhydrides. Concretely, they include maleic acid, fumaric acid, itaconic acid, maleic anhydride, itaconic anhydride, monomethyl maleate, monoethyl maleate, diethyl maleate, and monomethyl fumarate. Above all, most preferred is maleic anhydride.

The amount of the ethylenic unsaturated carboxylic acid or its anhydride to be added to or grafted on the olefinic polymer (that is, the degree of modification of the polymer) may fall between 0.0001 and 15% by weight of the olefinic polymer, but preferably between 0.001 and 10% by weight. Addition reaction or grafting reaction of the ethylenic unsaturated carboxylic acid or its anhydride to the olefinic polymer may be effected, for example, through radical polymerization in a solvent (e.g., xylene) in the presence of a catalyst (e.g., peroxide). The melt flow rate (MFR) of the thus-prepared, carboxylic acid-modified polyolefin, when measured at 190° C. under a load of 2160 g, preferably falls between 0.2 and 30 g/10 min, more preferably between 0.5 and 10 g/10 min. The adhesive resins may be used either singly or as combined.

For co-extruding the resin composition of the invention along with a thermoplastic resin, for example, employable is any of a multi-manifold flow-combining T-die process, a feed block flow-combining T-die process, or an inflation process.

The thus-obtained, co-extruded multi-layered structures can be fabricated into various articles (e.g., films, sheets, tubes, or bottles), which include, for example, the following:

(1) Multi-layered, co-stretched sheets or films, which are produced by uniaxially or biaxially stretching multi-layered structures (e.g., sheets or films), or biaxially stretching them and thereafter thermally fixing them.

(2) Multi-layered rolled sheets or films, which are produced by rolling multi-layered structures (e.g., sheets or films).

(3) Multi-layered tray or cup containers, which are produced through vacuum forming, pressure forming, vacuum-pressure forming or isothermal forming of multi-layered structures (e.g., sheets or films).

(4) Multi-layered bottle or cup containers, which are produced through stretch blow molding of multi-layered structures (e.g., pipes).

The method for fabricating the multi-layered structures of the invention is not limited to the above, and any other known fabricating methods (e.g., blow molding) could apply to the structures.

The co-extruded multi-layered structures and the co-injected multi-layered structures obtained in the manner as above smell little, and have few fish eyes. In addition, they are transparent and have few streaks. Therefore, they are favorable to materials for containers for drinks and edibles, for example, for deep-drawn containers, cup containers, and bottles.

EXAMPLES

The invention is described in more detail with reference to the following Examples, which, however, are not intended to restrict the scope of the invention. Unless otherwise specifically indicated, "%" and "parts" referred to herein are all by weight. Water used herein is all ion-exchanged water.

(1) Quantitative Determination of the Content of Carboxylic Acid (A):

20 g of a sample of dry pellets is put into 100 ml of ion-exchanged water, and extracted under heat at 95° C. for 6 hours. The resulting extract is subjected to acid-base titration with 1/50 N NaOH to determine the content of the carboxylic acid (A) in the sample. Phenolphthalein is used as an indicator.

(2) Determination of the Ratio of the Content ($\mu$mol/g) of Carboxylic Acid (a1) having a Molecular Weight of at Least 75 and its Salt to the Total Content ($\mu$mol/g) of Carboxylic Acid (A) and its Salt:

20 g of a sample of dry pellets is put into 100 ml of ion-exchanged water, and extracted under heat at 95° C. for 6 hours. The carboxyl anions of the acids (a1) and (A) and their salts in the resulting extract are quantitatively determined through ion chromatography, for which the column used is Yokokawa Electric's SCS5-252 and the eluent used is an aqueous solution of 0.1% phosphoric acid. From the data, the ratio of the content ($\mu$mol/g) of the carboxylic acid (a1) having a molecular weight of at least 75 and its salt to the total content ($\mu$mol/g) of the carboxylic acid (A) and its salt in the sample is obtained.

(3) Quantitative Determination Na, K, Mg and Ca Ions:

10 g of a sample of dry pellets is put into 50 ml of an aqueous solution of 0.01 N hydrochloric acid, and stirred at 95° C. for 6 hours. After thus stirred, the aqueous solution is subjected to quantitative analysis through ion chromatography, and the amount of Na, K, Mg and Ca ions therein is quantitatively determined. The column used is Yokokawa Electric's ICS-C25, and the eluent used is an aqueous solution containing 5.0 mM tartaric acid and 1.0 mM 2,6-pyridinedicarboxylic acid. For the quantitative determination, calibration curves of aqueous solutions of sodium chloride, potassium chloride, magnesium chloride and calcium chloride are used. From the data of Na ions, K ions, Mg ions and Ca ions thus obtained, the content of the alkaline earth metal salt (B) and the alkali metal salt (C) in the sample of dry pellets is derived in terms of the metal.

(4) Quantitative Determination of Phosphate Ions:

10 g of a sample of dry pellets is put into 50 ml of an aqueous solution of 0.01 N hydrochloric acid, and stirred at 95° C. for 6 hours. After thus stirred, the aqueous solution is subjected to quantitative analysis through ion chromatography, and the amount of phosphate ions therein is quantitatively determined. The column used is Yokokawa Electric's ICS-A23, and the eluent used is an aqueous solution containing 2.5 mM sodium carbonate and 1.0 mM sodium hydrogencarbonate. For the quantitative determination, a calibration curve of an aqueous solution of sodium dihydrogenphosphate is used. From the data, the content, in terms of the phosphate radical, of the phosphate compound (D) in the sample is obtained.

(5) Quantitative Determination of Boron Compound (E):

100 g of a sample of dry pellets is put into a ceramic crucible, and ashed in an electric furnace. The resulting ash is dissolved in 200 ml of an aqueous solution of 0.01 N nitric acid, and subjected to atomic absorption analysis to thereby determine the content, in terms of the boron element, of the boron compound (E) in the sample.

(6) Test for Forming Single-layered Films:

A resin sample is formed into single-layered films according to the method mentioned below, and it is evaluated based on the appearance of the films formed and on the resin deposition around dies indicating the long-run workability of the resin sample.

Extruder used: single-screw extruder, D20/20 (from Toyo Seiki),

L/D: 20,

Compression ratio: 4,

Screw diameter: 20 mmφ,

Screw: single-thread full-flight screw made of surface-nitrided steel,

Screw revolution: 40 rpm,

Die: straight hunger-type die having a width of 300 mm (from Toyo Seiki),

Lip-to-lip distance: 0.3 mm,

Cylinder and die temperature: C1/C2/C3/die=180/220/220/220 (° C.).

(6-a) Voids:

A sample of EVOH resin pellets is formed into a single-layered film in the manner as above. 30 minutes after the start of the process, the surface of the film formed is checked for visible voids therein. The film is evaluated according to the following criteria:

A: No void.

B: Only a few voids are sometimes seen, but negligible for practical use.

C: Some fine voids are all the time seen, but negligible for practical use.

D: Many voids are seen in the entire surface of the film.

E: Serious holes are formed in the entire surface of the film, and the film looks like a net.

(6-b) Resin Deposition Around Die:

A sample of EVOH resin pellets is formed into a single-layered film in the manner as above. 8 hours after the start of the process, the EVOH resin in the extruder is substituted with LDPE having MI of 1 (at 190° C. under a load of 2160 g), which takes one hour. The weight of the resin deposit around the die is measured. From the data, the resin deposition resistance of the sample is evaluated according to the criteria mentioned below.

A: Smaller than 0.5 g.

B: From 0.5 to 1 g.

C: From 1 to 5 g.

D: from 5 to 10 g.

E: Over 10 g.

(6-c) Long-run Workability:

A sample of EVOH resin pellets is formed into a single-layered film in the manner as above. 8 hours after the start of the process, the film formed is sampled and checked for fish eyes (having a macroscopically detectable size of larger than about 150 μm). The number of the fish eyes seen on the film is counted. From the number, per 1.0 m$^2$, of the thus-counted number of the fish eyes, the fish eye resistance of the sample is evaluated according to the criteria mentioned below.

A: Smaller than 20.

B: From 20 to 40.

C: From 40 to 60.

D: From 60 to 100.

E: Over 100.

(6-d) Self-purgeability:

A sample of EVOH resin pellets is formed into a single-layered film in the manner as above. One hour after the start of the process, the line is stopped, and this is cooled to room temperature. Next, the line is again turned on, and this is then heated up to the predetermined temperature. With that, the film formation in the line is again started, and the time taken until the level of the fish eyes seen on the film formed is restored to that seen on the film formed previously is read. Based on the time thus read, the sample is evaluated for self-purgeability according to the following criteria.

A: Restored immediately after the re-start.

B: Restored within 30 minutes.

C: Restored within 1 hour.

D: Restored within 5 hours.

E: Not restored.

(7) Yellowing Resistance:

8 g of a sample of dry pellets is sandwiched between hot plates (Shindo's desktop test press YS-5) heated at 230° C. with the hot plates being spaced from each other by 5 mm. In that condition, the sample is heated for 10 minutes. After having been thus heated, the sample is evaluated for macroscopic yellowing resistance according to the criteria mentioned below.

A: Colorless.

B: Slightly yellowed.

C: Visibly yellowed.

D: Greatly yellowed.

E: Browned.

(8) Weight Loss:

About 10 mg of a sample of dry pellets is set in a thermal analyzer, Seiko Electronics' TG/DTA-220 Model, and heated for 2 hours at 230° C. in a nitrogen atmosphere, and its weight loss is measured.

(9) Intrinsic Viscosity:

0.20 g of EVOH resin pellets to be tested are sampled, and dissolved in 40 ml of aqueous phenol (water/phenol=15/85 wt. %) under heat at 60° C. over a period of 3 to 4 hours, and the viscosity of the resulting solution is measured with an Ostwald viscometer (t0=90 seconds). According to the following formula, the intrinsic viscosity [η] of the sample is obtained.

$$[\eta]=(2\times(\eta sp-ln\eta rel))^{1/2}/C(l/g),$$

ηsp=t/t0−1 (specific viscosity),

ηrel=t/t0 (relative viscosity),

C: concentration of EVOH (g/l), t0: time taken by the blank (aqueous phenol) to pass through the viscometer, t: time taken by the sample-containing aqueous phenol to pass through the viscometer.

Example 1-1

A 45% solution in methanol of ethylene-vinyl acetate copolymer having an ethylene content of 38 mol % was put into a reactor for saponification, to which was added a solution of sodium hydroxide in methanol (80 g/liter), the amount of sodium hydroxide added being 0.4 equivalents to the vinyl acetate moiety of the copolymer. Then, methanol was added thereto to produce a solution having a copolymer concentration of 20%. This was heated up to 60° C. and reacted for about 4 hours with nitrogen gas being introduced into the reactor. After 4 hours, this was neutralized with acetic acid to stop the reaction. This was extruded out into water through a die having a circular opening, solidified therein and cut into pellets each having a diameter of about 3 mm and a length of about 5 mm. The resulting pellets were dewatered in a centrifuge. A large amount of water was added thereto, and the pellets were again dewatered. This operation was repeated. The ethylene-vinyl alcohol copolymer thus obtained had a degree of saponification of 99.6% and an intrinsic viscosity [η] of 0.0853 liter/g.

100 parts by weight of the wet pellets of ethylene-vinyl alcohol copolymer thus obtained (having a water content of 55%) were dipped in 370 parts by weight of an aqueous solution containing lactic acid (0.06 g/liter), magnesium lactate (1.082 g/liter), sodium lactate (0.438 g/liter),boric acid (0.505 g/liter) and potassium dihydrogenphosphate (0.158 g/liter), at 25° C. for 6 hours. After having been thus dipped, the pellets were dewatered, and dried at 80° C. for 3 hours and then at 107° C. for 24 hours in a hot air drier. Thus were obtained dry pellets.

In the dry pellets, the content of the carboxylic acid (A) was 0.77 μmol/g, the total content of the carboxylic acid (A) and its salt was 18.06 μmol/g (in this, the content of the carboxylic acid (a1) having a molecular weight of at least 75 and its salt was 18.06 μmol/g), the content of the alkaline earth metal salt (B) was 6.30 μmol/g in terms of the metal element, the content of the alkali metal salt (C) was 6.33 μmol/g in terms of the metal element, the content of the phosphate compound (D) was 91 ppm in terms of the phosphate radical, and the content of the boron compound (E) was 208 ppm in terms of the boron element. MFR (measured at 190° C. under a load of 2160 g) of the EVOH resin composition pellets was 1.6 g/10 min.

The dry pellets were formed into single-layered films in the manner as above, and tested for voids, deposition around die, long-run workability and self-purgeability. The samples tested herein were all evaluated as grade A for voids, deposition around die, long-run workability and self-purgeability.

The dry pellets were tested for yellowing resistance according to the method mentioned above. In the test, the sample was evaluated as grade A.

The pellets were tested for their odor according to the method mentioned below.

Test for Odor:

20 g of a sample of EVOH resin composition pellets is put into a 100-ml glass tube, and sealed with aluminium foil. This is heated at 150° C. for 90minutes in a hot air drier. After having been taken out of the drier, the sample is left to cool at room temperature for 1 hour. The sample tube is shaken two or three times. The aluminium foil is removed, and the sample in the tube is sniffed. The odor of the sample is evaluated according to the criteria mentioned below.

A: No smell.

B: Slight smell.

C: Smell.

D: Strong smell.

E: Very strong smell.

In the test for odor as above, the sample of the dry pellets prepared herein was evaluated as grade A.

The weight loss of the dry pellets was measured according to the method mentioned above, and it was 19%.

Examples 1-2 to 1-9, Comparative Examples 1-1 to 1-6

Dry pellets were prepared in the same manner as in Example 1-1. In this, however, EVOH having an ethylene content and an intrinsic viscosity as in Table 3 was used. After having been saponified, washed and dewatered, the EVOH pellets were dipped in different processing solutions as in Table 2. The dry pellets were formed into films and tested. The test data are in Table 4.

TABLE 2

| | Composition of Processing Solution | | | | | | | | |
|---|---|---|---|---|---|---|---|---|---|
| | Lactic Acid (g/liter) | Acetic Acid (g/liter) | KH$_2$PO$_4$ (g/liter) | Sodium Lactate (g/liter) | Sodium Acetate (g/liter) | Magnesium Lactate (g/liter) | Magnesium Acetate (g/liter) | Calcium Lactate (g/liter) | Boric Acid (g/liter) |
| Example 1-1 | 0.06 | 0 | 0.158 | 0.438 | 0 | 1.082 | 0 | 0 | 0.505 |
| Example 1-2 | 0.06 | 0 | 0.158 | 0.438 | 0 | 1.082 | 0 | 0 | 0 |
| Example 1-3 | 0.06 | 0 | 0.158 | 0.438 | 0 | 0.624 | 0 | 0 | 0.505 |
| Example 1-4 | 0.06 | 0 | 0.158 | 0.438 | 0 | 0 | 0 | 1.142 | 0.505 |
| Example 1-5 | 0.06 | 0 | 0.158 | 2.435 | 0 | 0.624 | 0 | 0 | 0.505 |
| Example 1-6 | 0.06 | 0 | 0.158 | 0.438 | 0 | 1.457 | 0 | 0 | 0.505 |
| Example 1-7 | 0.06 | 0 | 0.158 | 0.438 | 0 | 0.541 | 0 | 0 | 0.505 |

TABLE 2-continued

Composition of Processing Solution

| | Lactic Acid (g/liter) | Acetic Acid (g/liter) | $KH_2PO_4$ (g/liter) | Sodium Lactate (g/liter) | Sodium Acetate (g/liter) | Magnesium Lactate (g/liter) | Magnesium Acetate (g/liter) | Calcium Lactate (g/liter) | Boric Acid (g/liter) |
|---|---|---|---|---|---|---|---|---|---|
| Example 1-8 | 0.04 | 0.05 | 0.158 | 0.438 | 0 | 1.082 | 0 | 0 | 0.505 |
| Example 1-9 | 0.06 | 0 | 0.036 | 0.438 | 0 | 0.583 | 0 | 0 | 0.337 |
| Comp. Ex. 1-1 | 0.06 | 0 | 0.158 | 0.438 | 0 | 0 | 0 | 0 | 0.505 |
| Comp. Ex. 1-2 | 0.06 | 0 | 0.158 | 0.438 | 0 | 5.62 | 0 | 0 | 0.505 |
| Comp. Ex. 1-3 | 0.85 | 0 | 0.158 | 0.438 | 0 | 1.082 | 0 | 0 | 0.505 |
| Comp. Ex. 1-4 | 0 | 0 | 0.158 | 0.438 | 0 | 1.082 | 0 | 0 | 0.505 |
| Comp. Ex. 1-5 | 0.06 | 0 | 0.158 | 1.314 | 0 | 0.361 | 0 | 0 | 0.505 |
| Comp. Ex. 1-6 | 0.06 | 0 | 0.158 | 0.438 | 0 | 1.082 | 0 | 0 | 0.505 |

TABLE 3

Composition of Pellets

| | Ethylene Content (mol %) | Degree of Saponification (%) | $[\eta]0$ (liter/g) | MI (g/10 min) | Intrinsic Viscosity Profile | | | Alkaline Earth Metal Salt (B)(*1) | | |
|---|---|---|---|---|---|---|---|---|---|---|
| | | | | | $[\eta]10/[\eta]0$ | $[\eta]60/[\eta]0$ | $[\eta]60/[\eta]10$ | Mg (ppm) | Ca (ppm) | Total ($\mu$mol/g) |
| Example 1-1 | 38 | 99.6 | 0.085 | 1.6 | 0.23 | 0.30 | 1.30 | 153 | 0 | 6.30 |
| Example 1-2 | 38 | 99.6 | 0.112 | 1.6 | 0.22 | 0.29 | 1.32 | 155 | 0 | 6.38 |
| Example 1-3 | 38 | 99.6 | 0.085 | 1.5 | 0.49 | 0.65 | 1.33 | 92 | 0 | 3.79 |
| Example 1-4 | 38 | 99.6 | 0.085 | 1.7 | 0.22 | 0.25 | 1.14 | 0 | 255 | 6.36 |
| Example 1-5 | 38 | 99.6 | 0.085 | 1.5 | 0.21 | 0.28 | 1.33 | 89 | 0 | 3.66 |
| Example 1-6 | 38 | 99.6 | 0.085 | 1.6 | 0.17 | 0.23 | 1.35 | 208 | 0 | 8.56 |
| Example 1-7 | 38 | 99.6 | 0.085 | 1.7 | 0.48 | 0.75 | 1.56 | 78 | 0 | 3.21 |
| Example 1-8 | 38 | 99.6 | 0.085 | 1.6 | 0.25 | 0.33 | 1.32 | 149 | 0 | 6.13 |
| Example 1-9 | 44 | 99.6 | 0.095 | 1.7 | 0.35 | 0.27 | 0.77 | 80 | 0 | 3.29 |
| Co. Ex. 1-1 | 38 | 99.6 | 0.085 | 1.6 | 0.93 | 1.28 | 1.38 | 0 | 0 | 0.00 |
| Co. Ex. 1-2 | 38 | 99.6 | 0.085 | 1.8 | 0.08 | 0.10 | 1.25 | 810 | 0 | 33.33 |
| Co. Ex. 1-3 | 38 | 99.6 | 0.085 | 1.6 | 0.52 | 1.02 | 1.96 | 155 | 0 | 6.38 |
| Co. Ex. 1-4 | 38 | 99.6 | 0.085 | 1.6 | 0.09 | 0.15 | 1.67 | 154 | 0 | 6.34 |
| Co. Ex. 1-5 | 33 | 99.6 | 0.084 | 1.5 | 0.28 | 0.95 | 3.39 | 50 | 0 | 2.06 |
| Co. Ex. 1-6 | 27 | 99.6 | 0.084 | 1.5 | 0.21 | 2.01 | 9.57 | 151 | 0 | 6.21 |

| | Alkali Metal Salt (C)(*2) | | | Carboxylic Acid (A) | | | Boron Compound(*6) | Phosphate Compound(*7) | |
|---|---|---|---|---|---|---|---|---|---|
| | Na (ppm) | K (ppm) | Total ($\mu$mol/g) | Content(*3) | (A)(*4) | (a)/(A)(*5) | (ppm) | (ppm) | Formula (8)(*8) |
| Example 1-1 | 108 | 64 | 6.33 | 0.77 | 18.06 | 1.00 | 208 | 91 | 6.33 |
| Example 1-2 | 101 | 64 | 6.04 | 0.79 | 17.94 | 1.00 | 0 | 92 | 7.02 |
| Example 1-3 | 100 | 71 | 6.16 | 0.73 | 12.65 | 1.00 | 210 | 101 | 4.45 |
| Example 1-4 | 105 | 63 | 6.18 | 0.78 | 18.07 | 1.00 | 203 | 90 | 7.02 |
| Example 1-5 | 610 | 67 | 28.23 | 0.79 | 34.65 | 1.00 | 206 | 95 | 6.97 |
| Example 1-6 | 98 | 63 | 5.87 | 0.83 | 22.21 | 1.00 | 207 | 90 | 9.18 |
| Example 1-7 | 107 | 64 | 6.53 | 0.75 | 11.82 | 1.00 | 201 | 105 | 3.92 |
| Example 1-8 | 110 | 63 | 6.40 | 0.92 | 17.97 | 0.95 | 208 | 90 | 6.81 |
| Example 1-9 | 105 | 14 | 4.93 | 0.72 | 11.87 | 1.00 | 139 | 20 | 3.81 |
| Co. Ex. 1-1 | 108 | 64 | 6.33 | 0.77 | 5.47 | 1.00 | 209 | 91 | 6.68 |
| Co. Ex. 1-2 | 99 | 65 | 5.97 | 0.67 | 71.64 | 1.00 | 205 | 93 | 33.98 |
| Co. Ex. 1-3 | 101 | 64 | 6.02 | 11.1 | 28.25 | 1.00 | 207 | 91 | 5.99 |
| Co. Ex. 1-4 | 107 | 63 | 6.27 | 0 | 17.33 | 1.00 | 208 | 90 | 7.09 |
| Co. Ex. 1-5 | 350 | 65 | 16.89 | 0.81 | 20.15 | 1.00 | 206 | 92 | 4.00 |
| Co. Ex. 1-6 | 102 | 68 | 6.18 | 0.76 | 17.62 | 1.00 | 208 | 91 | 6.87 |

(*1),(*2)in terms of the metal element.
(*3)as $\mu$mol/g.
(*4)(A) = total content ($\mu$mol/g) of carboxylic acid (A) and its salt.
(*5)(a)/(A) = (content of carboxylic acid (a1) having a molecular weight of at least 75 and its salt)/(total content of carboxylic acid (A) and its salt).
(*6)in terms of the boron element.
(*7)in terms of the phosphate radical.
(*8)parameter of formula (8): $M_{II} + 0.12 \times M_I - 0.1 \times K \times Ac$.

TABLE 4

Test Results

| | Voids | Deposition around Die | Long-run Workability | Self-purgeability | Yellowing Resistance | Odor | Weight Loss (wt. %) |
|---|---|---|---|---|---|---|---|
| Example 1-1 | A | A | A | A | A | A | 19 |
| Example 1-2 | A | A | B | A | A | A | 20 |
| Example 1-3 | A | B | B | A | A | A | 17 |
| Example 1-4 | A | A | A | A | B | A | 20 |
| Example 1-5 | A | B | A | A | B | A | 20 |
| Example 1-6 | B | A | A | A | B | A | 29 |
| Example 1-7 | A | B | B | B | A | A | 16 |
| Example 1-8 | A | A | A | A | A | B | 18 |
| Example 1-9 | A | A | A | A | A | A | 8 |
| Comp. Ex. 1-1 | A | D | D | D | A | A | 1 |
| Comp. Ex. 1-2 | E | * | * | * | E | D | 48 |
| Comp. Ex. 1-3 | A | D | C | D | A | B | 3 |
| Comp. Ex. 1-4 | C | * | * | * | E | C | 38 |
| Comp. Ex. 1-5 | A | D | E | D | B | A | 4 |
| Comp. Ex. 1-6 | C | * | * | * | D | C | 36 |

* not tested.

The samples of Examples 1-2 to 1-8 are compared with the sample of Example 1-1. Not containing the boron compound (E), the long-run workability of the sample of Example 1-2 lowered a little. The content of the alkaline earth metal salt (B) in the sample of Example 1-3 is lower than the lowermost limit of the formula (8); and this sample deposited a little around the die, and its long-run workability lowered a little. The sample of Example 1-4 contains a calcium salt as the alkaline earth metal salt (B); and the films of this sample yellowed a little. In the sample of Example 1-5, the content of the alkaline earth metal salt (B) is lower than the lowermost limit of the formula (8), but the parameter that depends on the contents of the carboxylic acid (A), the alkaline earth metal salt (B) and the alkali metal salt (C) satisfies the formula (9); and this sample deposited a little around the die, and its films yellowed a little. In the sample of Example 1-6, the content of the alkaline earth metal salt (B) satisfies the formula (8), but the parameter that depends on the content of the carboxylic acid (A), the alkaline earth metal salt (B) and the alkali metal salt (C) is over the uppermost limit of the formula (9); and the films of this sample had a few voids, and yellowed a little. In the sample of Example 1-7, the content of the alkaline earth metal salt (B) is lower than the lowermost limit of the formula (8), and the parameter that depends on the content of the carboxylic acid (A), the alkaline earth metal salt (B) and the alkali metal salt (C) is lower than the lowermost limit of the formula (9); and this sample deposited a little around the die, and its long-run workability and self-purgeability lowered a little. The sample of Example 1-8 contains acetic acid having a molecular weight of smaller than 75, as the carboxylic acid (A); and it smelled a little while being formed into films.

As in the above, the samples of the EVOH resin composition of the invention prepared in Examples 1-2 to 1-8 are inferior in some degree to the sample thereof prepared in Example 1-1 in point of their physical properties. However, the films of these samples of the invention all have good appearance with no or negligible voids. While formed into films, the samples did not deposit or deposited only a little around the die; and their long-run workability and self-purgeability are all good.

The sample of Example 1-9, in which the EVOH used has an ethylene content of 44 mol %, was also good in point of the characteristics noted above.

However, the comparative samples are all much inferior to the samples of the invention. In Comparative Example 1-1, the content of the alkaline earth metal salt (B) is lower than 2 $\mu$mol/g; and in Comparative Example 1-3, the content of the carboxylic acid (A) is larger than 5 $\mu$mol/g. These comparative samples deposited much around the die; and their long-run workability and self-purgeability are not good. In Comparative Example 1-2, the content of the alkaline earth metal salt (B) is larger than 25 $\mu$mol/g; and in Comparative Example 1-4, the content of the carboxylic acid (A) is lower than 0.05 $\mu$mol/g. The films of these comparative samples had many voids, and forming them in long-run working lines is substantially impossible. In addition, the films yellowed greatly.

In the sample of Comparative Example 1-5, the content of the alkaline earth metal salt (B) and that of the alkali metal salt (C) are nearly the same as those in Example 1 of the prior art, Japanese Patent Laid-Open No. 67898/1998, and the ethylene content of the EVOH used in the former is 33 mol %. The intrinsic viscosity profile of this comparative sample, [η]60/[η]0 is over 0.8. This deposited much around the die, and its long-run workability and self-purgeability were poor.

In Comparative Example 1-6, the contents of the carboxylic acid (A), the alkaline earth metal salt (B), the alkali metal salt (C), the boron compound (E) and the phosphate compound (D) are nearly the same as those in Example 1-1, but the ethylene content of the EVOH used in the former is 27 mol %. The intrinsic viscosity profile of this comparative sample, [η]60/[η]0 is over 0.8. Its films are not good in all aspects tested herein.

Example 2-1

A 45% solution in methanol of ethylene-vinyl ester copolymer having an ethylene content of 38 mol % was put into a reactor for saponification, to which was added a solution of sodium hydroxide in methanol (80 g/liter), the amount of sodium hydroxide added being 0.4 equivalents to the vinyl ester moiety of the copolymer. Then, methanol was added thereto to produce a solution having a copolymer concentration of 20%. This was heated up to 60° C. and reacted for about 4 hours with nitrogen gas being introduced into the reactor. After 4 hours, this was neutralized with acetic acid to stop the reaction. This was extruded out into water through a die having a circular opening, solidified therein and cut into pellets each having a diameter of about 3 mm and a length of about 5 mm. The resulting pellets were dewatered in a centrifuge. A large amount of water was added thereto, and the pellets were again dewatered. This operation was repeated. The ethylene-vinyl alcohol copolymer thus obtained had a degree of saponification of 99.6% and an intrinsic viscosity [η] of 0.0853 liter/g.

100 parts by weight of the wet pellets of ethylene-vinyl alcohol copolymer thus obtained (having a water content of 55%) were dipped in 370 parts by weight of an aqueous solution containing acetic acid (0.375 g/liter), magnesium acetate (0.732 g/liter), sodium acetate (0.321 g/liter), boric acid (0.505 g/liter) and potassium dihydrogenphosphate (0.158 g/liter), at 25° C. for 6 hours. After having been thus dipped, the pellets were dewatered, and dried at 80° C. for 3 hours and then at 107° C. for 24 hours in a hot air drier. Thus were obtained dry pellets.

In the dry pellets, the content of acetic acid was 2.50 μmol/g, that of the alkaline earth metal salt (B) was 6.30 μmol/g in terms of the metal element, that of the alkali metal salt (C) was 6.26 μmol/g in terms of the metal element, that of the phosphate compound (D) was 91 ppm in terms of the phosphate radical, and that of the boron compound (E) was 208 ppm in terms of the boron element. MFR (measured at 190° C. under a load of 2160 g) of the EVOH resin composition pellets was 1.6 g/10 min.

The dry pellets were formed into single-layered films in the manner as above, and tested for voids, deposition around die, long-run workability and self-purgeability. The samples tested herein were all evaluated as grade A for voids, deposition around die, long-run workability and self-purgeability.

The dry pellets were tested for yellowing resistance according to the method mentioned above. In the test, the sample was evaluated as grade A.

The weight loss of the dry pellets was measured according to the method mentioned above, and it was 19%.

Examples 2-2 to 2-7, Comparative Examples 2-1 to 2-6

Dry pellets were prepared in the same manner as in Example 2-1. In this, however, EVOH having an ethylene content and an intrinsic viscosity as in Table 6 was used. After having been saponified, washed and dewatered, the EVOH pellets were dipped in different processing-solutions as in Table 5. The dry pellets were formed into films and tested. The test data are in Table 7.

TABLE 5

Composition of Processing Solution (2)

| | Acetic Acid (g/liter) | Magnesium Acetate (g/liter) | Calcium Acetate (g/liter) | Sodium Acetate (g/liter) | Boric Acid (g/liter) | $KH_2PO_4$ (g/liter) |
|---|---|---|---|---|---|---|
| Example 2-1 | 0.375 | 0.732 | 0 | 0.321 | 0.505 | 0.158 |
| Example 2-2 | 0.375 | 0.732 | 0 | 0.321 | 0 | 0.158 |
| Example 2-3 | 0.375 | 1.001 | 0 | 0.321 | 0.505 | 0.158 |
| Example 2-4 | 0.375 | 0.492 | 0 | 0.321 | 0.505 | 0.158 |
| Example 2-5 | 0.375 | 0.293 | 0.5 | 0.321 | 0.505 | 0.158 |
| Example 2-6 | 0.375 | 0.392 | 0 | 0.321 | 0.337 | 0.158 |
| Example 2-7 | 0.375 | 0.392 | 0.45 | 0 | 0 | 0.158 |
| Comp. Ex. 2-1 | 0.375 | 0 | 0 | 0.321 | 0.505 | 0.158 |
| Comp. Ex. 2-2 | 0.375 | 3.976 | 0 | 0.321 | 0.505 | 0.158 |
| Comp. Ex. 2-3 | 2.75 | 0.732 | 0 | 0.321 | 0.505 | 0.158 |
| Comp. Ex. 2-4 | 0 | 0.732 | 0 | 0.321 | 0.505 | 0.158 |
| Comp. Ex. 2-5 | 0.375 | 0.075 | 0.5 | 0.642 | 0 | 0.316 |
| Comp. Ex. 2-6 | 0.375 | 0.732 | 0 | 0.321 | 0.505 | 0.158 |

TABLE 6

Composition of Pellets (2)

| | Ethylene Content (mol %) | Degree of Saponification (%) | $[\eta]0$ (liter/g) | MI (g/10 min) | Intrinsic Viscosity Profile | | | Content of Acetic Acid (A)(*1) |
|---|---|---|---|---|---|---|---|---|
| | | | | | $[\eta]10/[\eta]0$ | $[\eta]60/[\eta]0$ | $[\eta]60/[\eta]10$ | |
| Example 2-1 | 38 | 99.6 | 0.085 | 1.6 | 0.22 | 0.3 | 1.36 | 2.50 |
| Example 2-2 | 38 | 99.6 | 0.112 | 1.6 | 0.23 | 0.32 | 1.39 | 2.50 |
| Example 2-3 | 38 | 99.6 | 0.085 | 1.6 | 0.15 | 0.2 | 1.33 | 2.50 |
| Example 2-4 | 38 | 99.6 | 0.085 | 1.5 | 0.42 | 0.58 | 1.38 | 2.50 |
| Example 2-5 | 38 | 99.6 | 0.085 | 1.7 | 0.24 | 0.32 | 1.33 | 2.50 |
| Example 2-6 | 44 | 99.6 | 0.095 | 1.7 | 0.35 | 0.27 | 0.77 | 2.50 |
| Example 2-7 | 35 | 99.6 | 0.088 | 8.6 | 0.35 | 0.8 | 2.29 | 1.33 |
| Co. Ex. 2-1 | 38 | 99.6 | 0.085 | 1.5 | 1.25 | 1.6 | 1.28 | 2.50 |
| Co. Ex. 2-2 | 38 | 99.6 | 0.085 | 1.6 | 0.09 | 0.11 | 1.22 | 2.50 |
| Co. Ex. 2-3 | 38 | 99.6 | 0.085 | 1.7 | 0.68 | 1.38 | 2.03 | 18.32 |
| Co. Ex. 2-4 | 38 | 99.6 | 0.085 | 1.6 | 0.1 | 0.13 | 1.30 | 0 |
| Co. Ex. 2-5 | 38 | 99.6 | 0.112 | 1.6 | 0.73 | 1.33 | 1.82 | 2.50 |
| Co. Ex. 2-6 | 27 | 99.6 | 0.084 | 1.6 | 0.22 | 2.15 | 9.77 | 2.50 |

TABLE 6-continued

Composition of Pellets (2)

| | Alkaline Earth Metal Salt (B)(*2) | | | Alkali Metal Salt (C)(*3) | | | Boron | Phosphate | |
| --- | --- | --- | --- | --- | --- | --- | --- | --- | --- |
| | Mg (ppm) | Ca (ppm) | Total (μmol/g) | Na (ppm) | K (ppm) | Total (μmol/g) | Compound(*6) (ppm) | Compound(*7) (ppm) | Formula (8)(*6) |
| Example 2-1 | 153 | 0 | 6.30 | 106 | 64 | 6.26 | 208 | 91 | 6.80 |
| Example 2-2 | 147 | 0 | 6.05 | 105 | 65 | 6.23 | 0 | 92 | 6.55 |
| Example 2-3 | 205 | 0 | 8.44 | 100 | 62 | 5.93 | 205 | 101 | 8.90 |
| Example 2-4 | 101 | 0 | 4.16 | 101 | 67 | 6.09 | 212 | 90 | 4.64 |
| Example 2-5 | 60 | 154 | 6.31 | 99 | 63 | 5.92 | 200 | 95 | 6.77 |
| Example 2-6 | 80 | 0 | 3.29 | 105 | 14 | 4.93 | 139 | 90 | 3.63 |
| Example 2-7 | 85 | 128 | 6.69 | 0 | 0 | 0.00 | 0 | 105 | 6.56 |
| Co. Ex. 2-1 | 0 | 0 | 0.00 | 110 | 69 | 6.56 | 215 | 91 | 0.54 |
| Co. Ex. 2-2 | 815 | 0 | 33.54 | 94 | 62 | 5.66 | 210 | 93 | 33.97 |
| Co. Ex. 2-3 | 149 | 0 | 6.13 | 98 | 72 | 6.11 | 198 | 91 | 5.03 |
| Co. Ex. 2-4 | 156 | 0 | 6.42 | 110 | 66 | 6.47 | 205 | 90 | 7.20 |
| Co. Ex. 2-5 | 15 | 151 | 4.38 | 0 | 140 | 3.58 | 0 | 198 | 4.56 |
| Co. Ex. 2-6 | 155 | 0 | 6.38 | 102 | 64 | 6.07 | 207 | 90 | 6.86 |

(*1)as μmol/g.
(*2),(*3)in terms of the metal element.
(*4)in terms of the boron element.
(*5)in terms of the phosphate radical.
(*6)parameter of formula (8): $M_{II} + 0.12 \times M_I - 0.1 \times K \times Ac$.

TABLE 7

Test Results (2)

| | Voids | Deposition around Die | Long-run Workability | Self-purgeability | Yellowing Resistance | Weight Loss (wt. %) |
| --- | --- | --- | --- | --- | --- | --- |
| Example 2-1 | A | A | A | A | A | 19 |
| Example 2-2 | A | A | B | A | A | 18 |
| Example 2-3 | B | A | A | A | B | 25 |
| Example 2-4 | A | B | B | B | A | 15 |
| Example 2-5 | A | A | A | A | B | 20 |
| Example 2-6 | A | A | A | A | A | 8 |
| Example 2-7 | B | A | B | B | B | 24 |
| Comp. Example 2-1 | A | E | E | E | A | 1 |
| Comp. Example 2-2 | E | * | * | * | D | 50 |
| Comp. Example 2-3 | A | D | D | D | B | 8 |
| Comp. Example 2-4 | C | * | * | * | C | 38 |
| Comp. Example 2-5 | A | C | C | C | B | 9 |
| Comp. Example 2-6 | C | * | * | * | D | 36 |

* not tested.

The samples of Examples 2-2 to 2-5 are compared with the sample of Example 2-1. Not containing the boron compound (E), the long-run workability of the sample of Example 2-2 lowered a little. In the sample of Example 2-3, the content of the alkaline earth metal salt (B) satisfies the formula (8), but the parameter that depends on the contents of the carboxylic acid (A), the alkaline earth metal salt (B) and the alkali metal salt (C) is over the uppermost limit of the formula (9'); and the films of this sample had a few voids, and yellowed a little. The content of the alkaline earth metal salt (B) in the sample of Example 2-4 is lower than the lowermost limit of the formula (8'); and this sample deposited a little around the die, and its long-run workability and self-purgeability lowered a little. The sample of Example 2-5 contains a calcium salt as the alkaline earth metal salt (B); and the films of this sample yellowed a little. The samples of the EVOH resin composition of the invention prepared in Examples 2-2 to 2-5 are inferior in some degree to the sample thereof prepared in Example 2-1 in point of their physical properties. However, the films of these samples of the invention all have good appearance with no or negligible voids. While formed into films, the samples did not deposit or deposited only a little around the die; and their long-run workability and self-purgeability are all good.

The sample of Example 2-6, in which the EVOH used has an ethylene content of 44 mol %, was also good in point of the characteristics noted above.

However, the comparative samples are all much inferior to the samples of the invention. In Comparative Example 2-1, the content of the alkaline earth metal salt (B) is lower than 2 μmol/g; and in Comparative Example 2-3, the content of acetic acid (this is the carboxylic acid (a2) having a molecular weight of lower than 75) is larger than 15 μmol/g. These comparative samples deposited much around the die; and their long-run workability and self-purgeability are not good. In Comparative Example 2-2, the content of the alkaline earth metal salt (B) is larger than 25 μmol/g; and in Comparative Example 2-4, the content of acetic acid (this is the carboxylic acid (a2) having a molecular weight of lower than 75) is lower than 0.2 μmol/g. The films of these comparative samples had many voids, and forming them in long-run working lines is substantially impossible. In addition, the films yellowed greatly.

Comparative Example 2-5 corresponds to Example 7 of the prior art, Japanese Patent Laid-Open No. 66262/1989, and its intrinsic viscosity profile, [η]60/[η]0 is over 0.8. This deposited much around the die, and its long-run workability and self-purgeability were poor.

In Comparative Example 2-6, the contents of acetic acid (this is the carboxylic acid (a2) having a molecular weight of lower than 75), the alkaline earth metal salt (B), the alkali metal salt (C), the phosphate compound (D) and the boron compound (E) are nearly the same as those in Example 2-1, but the ethylene content of the EVOH used in the former is 27 mol %. The intrinsic viscosity profile of this comparative sample, [η]60/[η]0 is over 0.8. Its films are not good in all aspects tested herein.

As described in detail with reference to its preferred embodiments, the invention provides a resin composition comprising an ethylene-vinyl alcohol copolymer, and a multi-layered structure comprising the resin composition. Adhering little to dies while worked, the resin composition ensures good long-run workability and self-purgeability; and its shaped articles have good appearance with few voids and are yellowed little.

While the invention has been described in detail and with reference to specific embodiments thereof, it will be apparent to one skilled in the art that various changes and modifications can be made therein without departing from the spirit and scope thereof.

What is claimed is:

1. An ethylene-vinyl alcohol copolymer resin composition, wherein the profile of its intrinsic viscosity [η] in heat treatment at 220° C. in a nitrogen atmosphere satisfies the following formulae (1) to (3), wherein said ethylene-vinyl alcohol copolymer resin composition contains
from 0.2 to 15 μmol/g of a carboxylic acid (a2) having a molecular weight of smaller than 75, and
from 2 to 25 μmol/g, in terms of the metal element, of an alkaline earth metal salt (B), and wherein a content $M_{II}$ of the alkaline earth metal salt (B) falls within a range that satisfies the following formulae (6) to (8):

$$0.05 \leq [\eta]0 \leq 0.2 \quad (1)$$

$$0.12 \leq [\eta]10/[\eta]0 \leq 0.6 \quad (2)$$

$$0.1 \leq [\eta]60/[\eta]0 \leq 0.8 \quad (3)$$

$$X = 0.0257 \times E^2 - 2.31 \times E + 54.7 \quad (6)$$

$$Y = 0.0372 \times E^2 - 2.43 \times E + 47.7 \quad (7)$$

$$X \leq M_{II} \leq Y \quad (8)$$

wherein

[η]0 indicates the intrinsic viscosity of the non-heated resin composition measured in l/g,

[η]10 indicates the intrinsic viscosity of the non-heated resin composition heated for 10 hours measured in l/g,

[η]60 indicates the intrinsic viscosity of the non-heated resin composition heated for 60 hours measured in l/g, E indicates the ethylene content in mol % of the ethylene-vinyl alcohol copolymer, and $M_{II}$ indicates the content of the alkaline earth metal salt (B) in μmol/g in terms of the metal element, in the resin composition.

2. The resin composition as claimed in claim 1, wherein the carboxylic acid (a2) having a molecular weight of smaller than 75 is an acetic acid.

3. The resin composition as claimed in claim 1, of which the profile of the intrinsic viscosity [η] in heat treatment at 220° C. in a nitrogen atmosphere satisfies the following formula (5):

$$0.2[\eta]60/[\eta]10 \leq 2.5 \quad (5).$$

4. An ethylene-vinyl alcohol copolymer resin composition, wherein the profile of its intrinsic viscosity [η] in heat treatment at 220° C. in a nitrogen atmosphere satisfies the following formulae (1) to (3), wherein said ethylene-vinyl alcohol copolymer resin composition contains
from 0.2 to 15 μmol/g of a carboxylic acid (a2) having a molecular weight of smaller than 75,
from 2 to 25 μmol/g, in terms of the metal element, of an alkaline earth metal salt (B), and
an alkali metal salt (C) within a range that satisfies the following formulae (6), (7) and (9):

$$0.05 \leq [\eta]0 \leq 0.2 \quad (1)$$

$$0.12 \leq [\eta]10/[\eta]0 \leq 0.6 \quad (2)$$

$$0.1 \leq [\eta]60/[\eta]0 \leq 0.8 \quad (3)$$

$$X = 0.0257 \times E^2 - 2.31 \times E + 54.7 \quad (6)$$

$$Y = 0.0372 \times E^2 - 2.43 \times E + 47.7 \quad (7)$$

$$X = M_{II} + 0.12 \times M_I - 0.1 \times K \times Ac \leq Y \quad (9)$$

wherein

[η]0 indicates the intrinsic viscosity of the non-heated resin composition measured in l/g,

[η]10 indicates the intrinsic viscosity of the non-heated resin composition heated for 10 hours measured in l/g,

[η]60 indicates the intrinsic viscosity of the non-heated resin composition heated for 60 hours measured in l/g, E indicates the ethylene content in mol % of the ethylene-vinyl alcohol copolymer, $M_{II}$ indicates the content of the alkaline earth metal salt (B) in μmol/g in terms of the metal element, in the resin composition, $M_I$ indicates the content of the alkali metal salt (C) in μmol/g in terms of the metal element, in the resin composition, K indicates the acid value of the carboxylic acid (A), and Ac indicates the content of the carboxylic acid (A) in μmol/g in the resin composition.

5. The resin composition as claimed in claim 1, of which the weight loss on heating for 2 hours at 230° C. in a nitrogen atmosphere falls between 5% and 35%.

6. The resin composition as claimed in claim 1, which contains from 10 to 500 ppm, in terms of the phosphate radical, of a phosphate compound (D).

7. The resin composition as claimed in claim 1, which contains from 50 to 2000 ppm, in terms of the boron element, of a boron compound (E).

8. A shaped article of the resin composition as claimed in claim 1.

9. A multi-layered structure comprising at least one layer of the resin composition as claimed in claim 1.

* * * * *